(12) United States Patent
Batrinu et al.

(10) Patent No.: US 12,099,685 B2
(45) Date of Patent: Sep. 24, 2024

(54) WATER REJECTION MECHANISM FOR ULTRASONIC TOUCH SENSORS BASED ON INDIVIDUALLY PROCESSED INTERFACES

(71) Applicant: Infineon Technologies AG, Neubiberg (DE)

(72) Inventors: Costin Batrinu, Bucharest (RO); Gheorghe-Iulian Chivu, Targoviste (RO); Emanuel Stoicescu, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/468,999

(22) Filed: Sep. 18, 2023

(65) Prior Publication Data
US 2024/0184407 A1    Jun. 6, 2024

Related U.S. Application Data

(60) Provisional application No. 63/386,071, filed on Dec. 5, 2022.

(51) Int. Cl.
*G06F 3/043* (2006.01)
(52) U.S. Cl.
CPC .. *G06F 3/0436* (2013.01); *G06F 2203/04107* (2013.01)

(58) Field of Classification Search
CPC .............. G06F 3/0436; G06F 2203/04107
See application file for complete search history.

(56) References Cited

U.S. PATENT DOCUMENTS

| | | | |
|---|---|---|---|
| 2017/0192560 A1* | 7/2017 | Ham | G06F 3/016 |
| 2017/0192598 A1* | 7/2017 | Seen | G02B 6/0031 |
| 2017/0192610 A1* | 7/2017 | Park | G02F 1/134309 |
| 2017/0192614 A1* | 7/2017 | Lee | G06F 3/0443 |
| 2017/0193768 A1* | 7/2017 | Long | G06F 3/011 |

\* cited by examiner

*Primary Examiner* — Sejoon Ahn
(74) *Attorney, Agent, or Firm* — Harrity & Harrity, LLP

(57) ABSTRACT

An ultrasonic touch sensor includes a touch structure configured to receive a touch; a transmitter configured to transmit an ultrasonic transmit wave toward the touch structure; a receiver configured to receive ultrasonic reflected waves produced by a plurality of reflections of the ultrasonic transmit wave and generate a measurement signal representative of the ultrasonic reflected waves; and a measurement circuit configured to: acquire a first plurality of digital samples of the measurement signal during a first observation window that corresponds to a first ultrasonic reflected wave produced by a reflection of the ultrasonic transmit wave at the touch interface, acquire a second plurality of digital samples of the measurement signal during a second observation window that is subsequent in time to the first observation window, and determine whether a no-touch event or a touch event has occurred based on the first and the second plurality of digital samples.

25 Claims, 19 Drawing Sheets

WATER REJECTION MECHANISM FOR ULTRASONIC TOUCH SENSORS BASED ON INDIVIDUALLY PROCESSED INTERFACES

CROSS REFERENCE TO RELATED APPLICATION

This patent application claims priority to U.S. Provisional Patent Application No. 63/386,071, filed on Dec. 5, 2022, and entitled "WATER REJECTION MECHANISM FOR ULTRASONIC TOUCH SENSORS BASED ON INDIVIDUALLY PROCESSED INTERFACES." The disclosure of the prior application is considered part of and is incorporated by reference into this patent application.

BACKGROUND

Touch sensing through metal surfaces using ultrasound waves is currently being investigated as an alternative to capacitive touch sensing principles. Ultrasonic sensing relies on a transmission of an ultrasound wave directed at a touch structure and a reception and processing of a reflected waveform that is reflected back from the touch structure. A characteristic of the reflected waveform will depend on an existence or a non-existence of a touch event and can be used to discriminate between the existence or the non-existence of the touch event.

SUMMARY

In some implementations, an ultrasonic touch sensor includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and a measurement circuit coupled to the capacitive ultrasonic receiver and configured to: acquire a first plurality of digital samples of the measurement signal during a first observation window that corresponds to a first ultrasonic reflected wave produced by a reflection of the ultrasonic transmit wave at the touch interface, calculate a first distance value of the first plurality of digital samples relative to a reference signal, and determine a first comparison result based on whether the first distance value satisfies a first threshold range, acquire a second plurality of digital samples of the measurement signal during a second observation window that is subsequent in time to the first observation window, calculate a second distance value of the second plurality of digital samples relative to the reference signal, and determine a second comparison result based on whether the second distance value satisfies a second threshold range, and determine whether a no-touch event or a touch event has occurred based on the first comparison result and the second comparison result.

In some implementations, an ultrasonic touch sensor includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and a measurement circuit coupled to the capacitive ultrasonic receiver and configured to: acquire a first plurality of digital samples of the measurement signal during a first observation window that corresponds to a first ultrasonic reflected wave produced by a reflection of the ultrasonic transmit wave at the touch interface, and calculate a first distance value of the first plurality of digital samples relative to a reference signal, acquire a second plurality of digital samples of the measurement signal during a second observation window that is subsequent in time to the first observation window, and calculate a second distance value of the second plurality of digital samples relative to the reference signal, and determine whether a no-touch event or a touch event has occurred based on the first distance value and the second distance value.

In some implementations, an ultrasonic touch sensor includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and a measurement circuit coupled to the capacitive ultrasonic receiver and configured to: acquire a first plurality of digital samples of the measurement signal during a first observation window that corresponds to a first ultrasonic reflected wave produced by a reflection of the ultrasonic transmit wave at the touch interface, and calculate a first distance value of the first plurality of digital samples relative to a first plurality of reference samples that correspond to the first observation window, acquire a second plurality of digital samples of the measurement signal during a second observation window that is subsequent in time to the first observation window, and calculate a second distance value of the second plurality of digital samples relative to a second plurality of reference samples that correspond to the second observation window, and determine whether a no-touch event or a touch event has occurred based on the first distance value and the second distance value.

In some implementations, an ultrasonic touch sensor includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and a measurement circuit coupled to the capacitive ultrasonic receiver, wherein the measurement circuit is configured with a first observation window during which the measurement circuit is configured to acquire a first plurality of digital samples of the measurement signal, wherein the first plurality of digital samples correspond to a first ultrasonic reflected wave produced by a reflection of the ultrasonic transmit wave at the touch interface, wherein the measurement circuit is configured to search for a second observation window that is subsequent in time to the first observation window, wherein the measurement circuit is configured to acquire a second plurality of digital samples of the measurement signal in the second observation window, wherein the second observation window corresponds to a second ultrasonic reflected wave produced by a reflection of the ultrasonic transmit wave at a water-air interface formed by water being present on the touch surface, and wherein the measurement circuit is configured to determine whether a no-touch event or a touch event has occurred based on the first plurality of digital samples and the second plurality of digital samples.

BRIEF DESCRIPTION OF THE DRAWINGS

Implementations are described herein with reference to the appended drawings.

DETAILED DESCRIPTION

Figure 1:
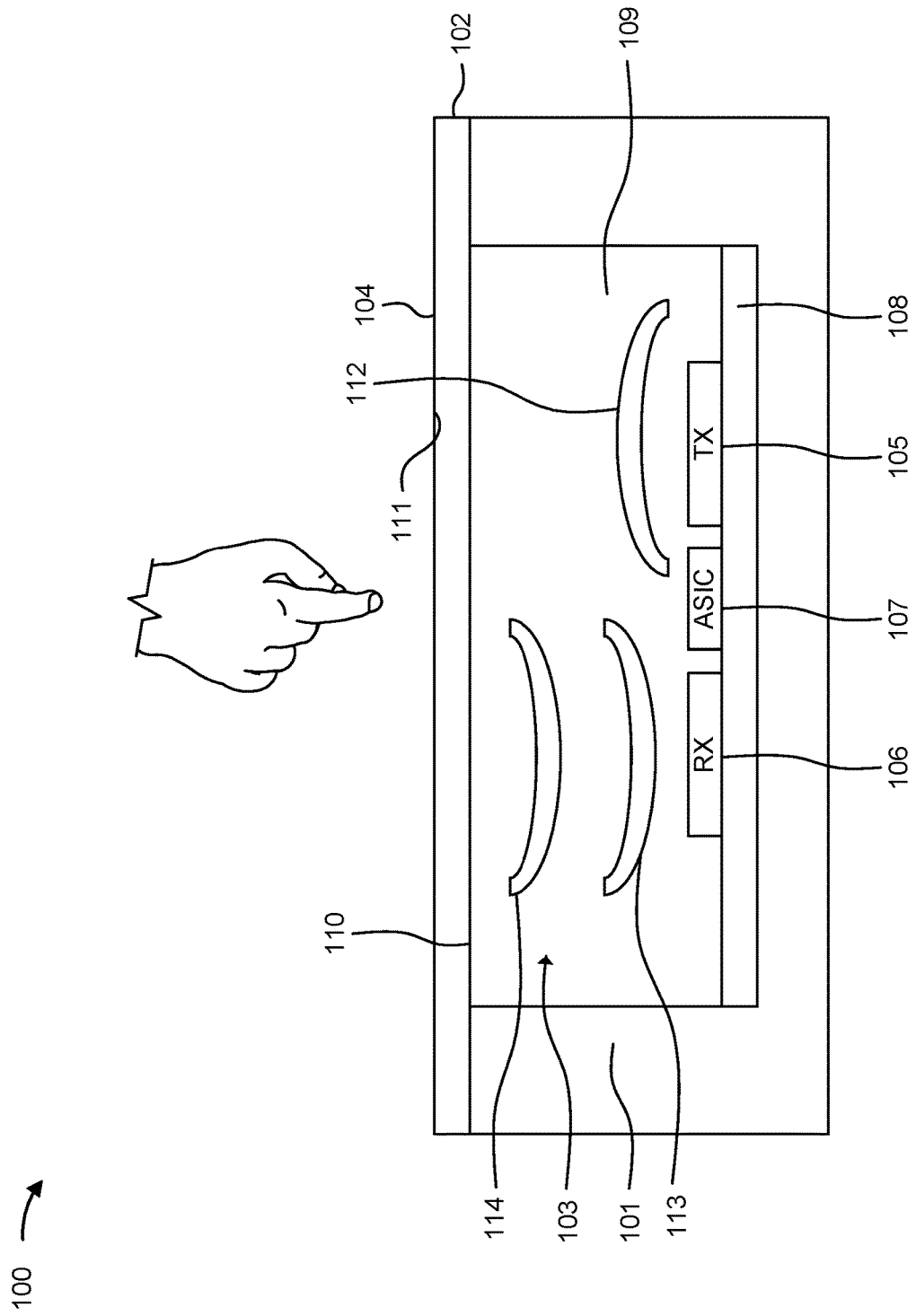
FIG. 1 illustrates an ultrasonic touch sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top," "bottom," "below," "above," "front," "behind," "back," "leading," "trailing," etc., may be used with reference to an orientation of the figures being described. Because parts of the implementations, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

"Sensor" may refer to a component which converts a property to be measured to an electrical signal (e.g., a current signal or a voltage signal). For a capacitive touch sensor, the property to be measured is a capacitance that is detected directly from a user making skin contact with a touch structure. For example, a conductive material may be coated on a non-touch side of the touch structure and a capacitor may be formed within the touch structure (e.g., between the conductive material disposed on the non-touch side and a touch side) when skin contact is made to the touch side of the touch structure. The capacitive touch sensor may measure a capacitance within the touch structure and detect changes in the capacitance for detecting touches. However, capacitive touch sensors are prone to false signals (e.g., false touch detections) and cannot operate reliably, if at all, when the touch surface is exposed to water. Thus, there is an interruption in touch detection functionality when the capacitive touch sensor is wet or submerged in water or another liquid. Because the capacitive touch sensor cannot operate correctly in a reliable manner when the touch surface is wet or submerged in water, a user is not able to properly interact with the capacitive touch in those cases.

For an ultrasonic touch sensor, the property to be measured is an ultrasound wave produced, for example, by a microelectromechanical system (MEMS) transducer. The ultrasound wave is directed at a touch structure where the ultrasound wave is reflected back by the touch structure as a reflected ultrasound wave. The reflected ultrasound wave can be used for sensing touch (e.g., a touch event) through metal surfaces. Specifically, the ultrasonic touch sensor can use the reflected ultrasound wave to discriminate between an existence of the touch event or a non-existence of the touch event (e.g., a no-touch event). However, the ultrasonic touch sensor may also be susceptible to false positives (unintended touch detection), for example, when water droplets fall onto the touch surface, and false negatives (loss of touch detection functionality) caused by water presence, in which case touches go undetected when water is present on the touch surface.

Some implementations disclosed herein are directed to using an ultrasonic touch sensor to discriminate between touch and no touch events, even when water is present on a touch surface of the ultrasonic touch sensor. As a result, a user may be able to properly interact with the ultrasonic touch sensor even when the touch surface is partially or fully covered by water.

The ultrasonic touch sensor may use capacitive micromachined ultrasonic transducer (CMUTs) as sensor elements to make touch/no-touch decisions when a touch surface of the ultrasonic touch sensor is exposed to water. The CMUTs use ultrasound waves as a basis for the touch/no-touch decision.

For example, when water comes into contact with the touch surface, the water forms an additional reflection interface with the water and air (e.g., a water-air interface). Accordingly, additional ultrasonic reflected waves are produced due to the additional reflection interface being formed. The additional ultrasonic reflected waves may include one or more secondary ultrasonic reflected waves caused by reflections bouncing between the water-air interface and the touch surface interface, where part of these secondary ultrasonic reflected waves travel back to a receiver CMUT arranged within the ultrasonic touch sensor. These additional ultrasonic reflected waves (e.g., echoes or reflections) contain additional information regarding the presence of water that may be used for detecting the present of water, or the absence thereof, and/or for making touch/no-touch decisions in the presence of water.

However, the additional information provided by the additional ultrasonic reflected waves may be distributed between multiple interfaces visible in the received ultrasonic signal, and even a slight change of the water on the touch surface (e.g., change in amount, a shift in the water-air interface in elevation and/or size, a shift in location, a shift in shape (e.g., water droplet shape), a shift in movement, including wobble or jiggle, etc.) may translate into significant and variable changes of the additional reflection interface, as well other interfaces of the above-mentioned interfaces. Thus, the additional reflection interface and other interfaces may change dynamically in the presence of water. Thus, some implementations are directed to increasing a robustness of water rejection (discussed below) by separately processing each ultrasonic reflected wave received from each reflection interface, one at a time (e.g., based on different observation windows targeted at different respective ultrasonic reflected waves), and combining the separately processed information to make a reliable touch/no-touch decision, even when water is present on the touch surface.

In some implementations, the ultrasonic touch sensor may be configured to perform individual data processing on two or more ultrasonic reflection interfaces separately in order to extract reflection data from the two or more ultrasonic reflection interfaces and use the separately acquired data in combination to make a touch/no-touch decision.

In some implementations, the ultrasonic touch sensor may be configured to perform individual data processing on two or more observation windows separately in order to extract data from the two or more observation windows and use the separately acquired data in combination to make a touch/no-touch decision.

In some implementations, the ultrasonic touch sensor may be configured to automatically detect one or more additional ultrasonic reflection interfaces (e.g., the water-air interface) formed by water interacting with the touch surface by using a sliding observation window method.

In some implementations, the ultrasonic touch sensor may be configured to apply a chain of processing operations in order to prepare an analog input signal for a sliding observation window, including individual interface processing and a final decision algorithm.

As a result, the ultrasonic touch sensor may have an increased robustness for making touch/no-touch decisions, even when water is present on the touch surface, including water rejection (e.g., rejecting false positives or false negatives) in humid environments, during precipitation, or near a body of water, where the touch structure may be susceptible to becoming exposed to water. Thus, one or more implementations may be directed to a method for detecting the presence of water on the touch surface of an ultrasonic touch sensor and, also, for increasing the robustness of the touch detection when water comes into contact with the touch surface.

FIG. 1 illustrates an ultrasonic touch sensor 100 according to one or more implementations. The ultrasonic touch sensor 100 includes a housing comprising a frame 101 and a touch structure 102 (e.g., a touch substrate) that form an ultrasound chamber 103. The frame 101 may be made of an encapsulant, such as overmolded thermoplastic or another type of molding material. As part of the housing, the frame 101 may have a recess that becomes the ultrasound chamber 103 when the touch structure 102 encloses the recess. In some implementations, part of the frame 101 may extend into and fill the ultrasound chamber 103, thereby covering one or more sensor components arranged therein. Epoxy or some other ultrasound-compatible material cast in the recess may be used. Accordingly, an area of the housing in which ultrasonic transducers reside may be referred to as an acoustic port, an ultrasound port, an acoustic chamber, or an ultrasound chamber, among other examples.

In either case, the touch structure 102 is used as a lid or a package cover that rests upon a touch side of the ultrasonic touch sensor 100. In the example shown, the ultrasound chamber 103 is an internal area or a cavity that is formed by the enclosure of the frame 101 and the touch structure 102. The touch structure 102 may be made of one or more metal layers, one or more plastic layers, and/or one or more layers made out of another solid material. Thus, the touch structure 102 may be a covering coupled to the frame 101, and the ultrasound chamber 103 may be an internal area that is defined, at least in part, by the touch structure 102 (e.g., an internal area defined between the frame 101 and the touch structure 102). The touch structure 102 includes a touch surface 104 at its external interface with an environment. The touch surface 104 is arranged and operable to receive contact (e.g., touches) from a user that can be detected by sensor circuitry.

In some implementations, lateral sides of the frame 101 may be at least partially open such that the ultrasound chamber 103 is not a fully enclosed volume. For example, the lateral sides of the frame 101 may include columns that support the touch structure 102 and/or the touch structure 102 may be supported by a coupling medium. For example, the coupling medium, such as a film layer, a silicone gel, or a soft epoxy, may be provided in the ultrasound chamber 103 and may be mechanically coupled to and between a circuit substrate at a bottom side of the ultrasound chamber 103 and the touch structure 102 at a top side of the ultrasound chamber 103 to provide support to the touch structure 102. In some implementations, the lateral sides of the ultrasound chamber 103 may be fully open, with the lateral sides of the frame 101 being absent, and the touch structure 102 may be partially or fully supported by the coupling medium. Thus, the coupling medium may be sufficiently rigid to support the touch structure 102 in cases which the lateral sides of the ultrasound chamber 103 are fully open.

The ultrasound chamber 103 contains the sensor circuitry used for detecting no-touch events and touch events at the touch surface 104. A touch event is an instance when the user makes contact with the touch surface 104, and a no-touch event is any other circumstance, including the occurrence of disturbing influences (e.g., error sources) that may occur in the absence of a touch event. The sensor circuitry is configured to distinguish between a touch event and a no-touch event, taking into account possible errors originating from the disturbing influences.

An ultrasound wave is a sound wave having a frequency of 20 kHz or higher. An ultrasound wave may be referred to as an ultrasonic transmit wave when the ultrasound wave is transmitted by a transmitter, and may be referred to as an ultrasonic reflected wave when the ultrasound wave has been reflected by the touch structure 102 for reception at a receiver. The sensor circuitry includes a transmitter (TX) 105 configured to transmit ultrasound waves (e.g., ultrasonic transmit waves), a receiver (RX) 106 configured to receive reflected ultrasound waves (e.g., ultrasonic reflected waves), and a sensor circuit 107 (e.g., an application specific integrated circuit (ASIC)). The transmitter 105 may be a capacitive ultrasonic transmitter and the receiver 106 may be a capacitive ultrasonic receiver. The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves for detecting no-touch events and touch events by applying a first touch detection algorithm, and control one or more components of the ultrasonic touch sensor 100, including the transmitter 105, the receiver 106, or any signal processing components of a signal processing chain of the sensor circuit 107. In some implementations, the sensor circuit 107 may evaluate an additional property of the ultrasonic touch sensor 100 (e.g., an internal pressure, a bias voltage, or a cross-coupling effect) from which a measurement signal is obtained and evaluated for detecting the no-touch events and the touch events by applying a second touch detection algorithm. In some implementations, both the first touch detection algorithm and the second touch detection algorithm may be used in combination for detecting the no-touch events and the touch events.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducers (CMUTs). In some implementations, the transmitter 105 and the receiver 106 may be combined into a single transceiver transducer that has a single flexible membrane.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal and transmit the excitation signal to the transmitter 105. The excitation signal is applied across the biased electrodes, causing the flexible membrane to vibrate according to the waveform of the excitation signal and producing a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof. Thus, the sensor circuit 107 may include a signal generator that is configured to generate an excitation signal for producing an ultrasonic wave. The transmitter 105 is configured to receive the excitation signal from the signal generator and transmit the ultrasonic wave based on the excitation signal.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the frame 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the ultrasound chamber 103 may be filled with a coupling medium 109, such as a silicone gel, a soft epoxy, a liquid, or any other material that enables the propagation of ultrasonic waves with no, or substantially no, attenuation. Thus, the coupling medium 109 may provide acoustic (e.g., ultrasound) coupling between the transmitter 105 and the receiver 106 with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. When providing mechanical coupling between the touch structure 102 and the receiver 106, the coupling medium 109 is a non-gaseous medium. In some implementations, the coupling medium 109 may provide structural support to the touch structure 102 (e.g., in instances when the lateral sides of the ultrasound chamber 103 are fully open).

The touch structure 102 has a first interface 110 and a second interface 111 that interacts with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 toward the touch structure 102 (e.g., at the first interface 110 and the second interface 111). The first interface 110 and the second interface 111 are configured to reflect the ultrasonic transmit wave 112 back into the ultrasound chamber 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113, and the second interface 111 reflects the ultrasonic transmit wave 112 by internal reflection to produce the ultrasonic reflected wave 114. Since the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received, and the sensor circuit 107 may obtain a first measurement signal from the continuous measurement signal in a first observation window corresponding to the ultrasonic reflected wave 113 and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can also be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 occurs when the touch surface 104 is touched by, for example, a finger of the user (e.g., a direct touch with skin making direct contact with the touch surface 104). The change in the ultrasonic reflected wave 114 can be detected or used at a receiver side of the ultrasonic touch sensor 100 for detecting the touch event or the no-touch event, as well as for determining touch location and touch force. Specifically, the touch event at the touch surface 104 may cause a damping effect where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the difference is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, a property of the ultrasonic reflected wave 114 may depend on the existence or the non-existence of the touch event. The property of the reflected ultrasonic sound wave can be measured at the sensor circuit 107 to discriminate between a presence of the touch event or the no-touch event.

Meanwhile, the acoustic impedance change resulting from the touch event may be minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, and/or environmental disturbances (such as dirt or water) on the touch surface 104. The touch detection algorithm may take into account or be insensitive to various calibration factors, including different touch surfaces, variations in mounting, non-linear behaviors, large offsets, and drifting effects.

In some implementations, the sensor circuit 107 may be configured to generate a first plurality of digital samples from a first signal (e.g., a reference measurement signal) generated by and output from the receiver 106 during a no-touch event (e.g., a reference no-touch event) during an observation window that corresponds to the ultrasonic reflected wave 114 reflected by the second interface 111. The first plurality of digital samples may represent an envelope of the first signal. The sensor circuit 107 may store the first plurality of digital samples as a plurality of reference samples in memory. In other words, the first signal corresponds to the ultrasonic reflected wave 114 received during the no-touch event and is used as a reference signal to be used for making touch/no-touch decisions during a touch monitoring operation. After obtaining and storing the plurality of reference samples, the sensor circuit 107 may be configured to generate a second plurality of digital samples from a second signal (e.g., a monitored measurement signal) generated by and output from the receiver 106 during the touch monitoring operation (e.g., during an excitation frame used for a touch/no-touch decision). The second plurality of digital samples may represent an envelope of the second signal. The sensor circuit 107 may calculate a distance (e.g., a Euclidean distance) of the second plurality of digital samples to the first plurality of digital samples (e.g., to the plurality of reference samples), and determine whether a no-touch event or a touch event has occurred at the touch surface 104 based on the distance. For example, if the distance is less than a threshold, the sensor circuit 107 may detect that a no-touch event has occurred. Alternatively, if the distance is equal to or greater than the threshold, the sensor circuit 107 may detect that a touch event has occurred.

Accordingly, the sensor circuit 107 may be configured to receive a measurement signal from the receiver 106 corresponding to the ultrasonic reflected wave 114 during the touch monitoring operation, compare the measurement signal with the reference signal to generate a comparison result (e.g., whether the measurement signal satisfies a threshold, or a defined correlation between the measurement signal and the reference signal satisfies the threshold), and determine a touch/no-touch decision based on the comparison result.

Alternatively, in some implementations, the first signal (e.g., the reference measurement signal) may be generated by and output from the receiver 106 during a touch event (e.g., a reference touch event). As a result, the plurality of reference samples may correspond to the ultrasonic reflected wave 114 received during the touch event and be stored in memory to be used by the sensor circuit 107 for making touch/no-touch decisions during the touch monitoring operation. Accordingly, in this case, if the distance calculated during the touch monitoring operation is less than a threshold, the sensor circuit 107 may detect that a touch event has occurred, and if the distance calculated during the touch monitoring operation is equal to or greater than the threshold, the sensor circuit 107 may detect that a no-touch event has occurred.

In some implementations, digital samples may be obtained from an ultrasonic reflected wave that is reflected by a different interface during the touch monitoring operation and compared with the reference signal in a similar manner as described above, including calculating a distance (e.g., a Euclidean distance) between the digital samples and reference samples of the reference signal and determining whether a no-touch event or a touch event has occurred at the touch surface based on whether or not the distance satisfies a threshold.

The touch detection algorithm may include a machine learning model that is trained to distinguish between a touch and no-touch event. Machine learning involves computers learning from data to perform tasks. Machine learning algorithms are used to train machine learning models based on sample data, known as "training data." Once trained, machine learning models may be used to make predictions, decisions, or classifications relating to new observations.

The sensor circuit 107 may distinguish between a touch and no-touch event using a machine learning model. The machine learning model may include and/or may be associated with, for example, a neural network. In some implementations, the sensor circuit 107 uses the machine learning model to distinguish between a touch and no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable (for example, that a no-touch, a touch, a short touch, a long touch, a soft touch, a hard touch, a static touch, a dynamic touch (e.g., a moving touch), a direct touch (e.g., a touch made by direct skin contact with the touch surface 104), and/or an indirect touch (e.g., a touch made by non-skin contact with the touch surface 104) is present at the touch surface 104).

The sensor circuit 107 may train, update, and/or refine the machine learning model to increase the accuracies of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

The touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 may be configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be on the order of 25 microseconds (μs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 μs). An excitation signal can have any shape (e.g., rectangular, sinusoidal, Gaussian, Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples, may be used for performing the direct down-conversion. Analog circuit blocks for such a down-conversion processing may include a multiplier or a diode. A low-pass filter cut-off frequency may be tuned to the bandwidth of the transmitted ultrasonic signal and the bandwidth of the transmitter 105. For example, the low-pass filter cut-off frequency may be set to 1 MHz or 2 MHz.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from a measurement signal obtained from measuring another property of the ultrasonic touch sensor 100 (e.g., internal pressure, bias voltage, or a cross-coupling effect) and store the digital samples in memory for evaluation.

A digital processor of the sensor circuit 107 may be operable to evaluate digital samples received in an observation window using the touch detection algorithm to determine whether there is a no-touch event or a touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time required for the ultrasonic transmit wave 112 to travel from the transmitter 105, to the first interface 110, and back to the receiver 106. Likewise, a time-of-flight of a second reflection (e.g., the ultrasonic reflected wave 114) is a time required for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1 is provided as an example. Other examples may differ from what is described with regard to FIG. 1. For example, in some implementations, an array or transmitters, receivers, or transceivers may be provided within the ultrasound chamber 103 of the ultrasonic touch sensor 100. In some implementations, the touch structure 102 may include multiple layers resulting in more than two ultrasound reflections or echoes. In some implementations, additional circuit components may be added without deviating from the disclosure provided above.

Figure 2:
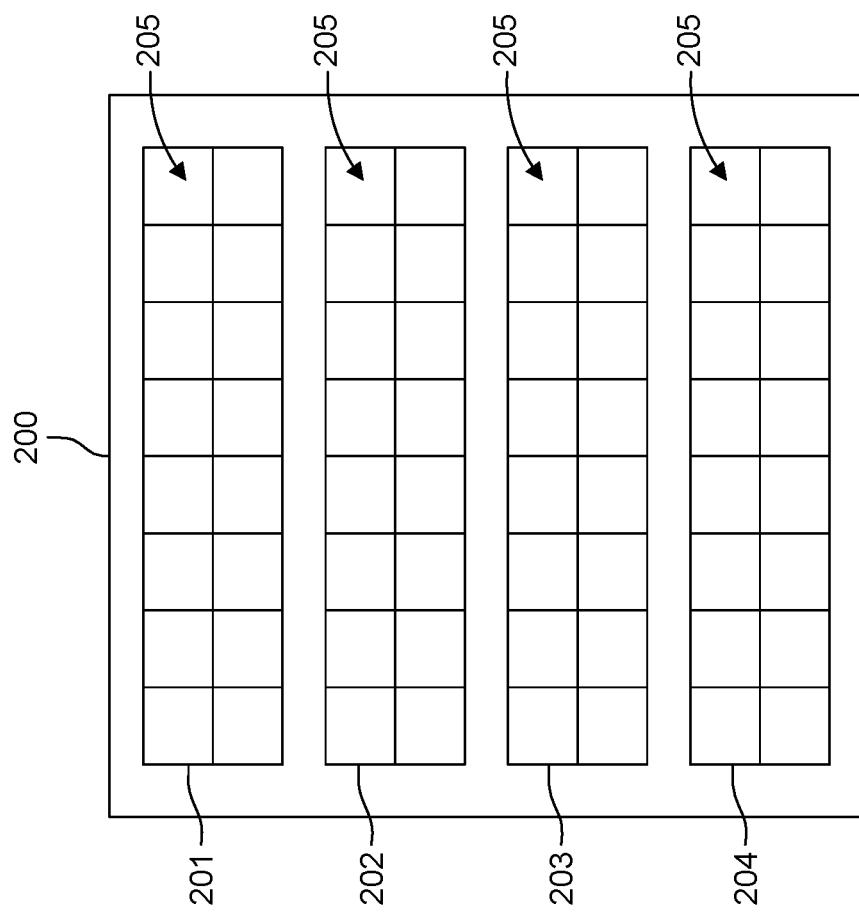
FIG. 2 illustrates a top view of an array of transceiver transducers according to one or more implementations.

FIG. 2 illustrates a top view of an array of transceiver transducers 200 according to one or more implementations. The array of transceiver transducers 200 extends in two dimensions within the ultrasound chamber 103 to cover a substantial area under the touch structure 102. The array of transceiver transducers 200 may include two or more sub-arrays 201-204 that each includes a subset of transceiver transducers 205. Individual transceiver transducers 205 of the array of transceiver transducers 200 are configurable as transmitters, receivers, or transceivers. Additionally, the individual transceiver transducers 205 of the array of transceiver transducers 200 may be individually configured into a receiving mode, a transmitting mode, or a transceiving mode on a static (e.g., fixed) basis or on a dynamic basis. As a result, the transceiver transducers 205 may be configured to provide a configuration best suited for making a touch/no-touch decision. Thus, the transmitter 105 and the receiver 106 may be transceiver transducers 205 configured as a transmitter and a receiver, respectively.

This configurability may be set on an individual basis (transducer-by-transducer), on a sub-array basis, or some other basis. Moreover, while the transceiver transducers 205 are shown to be substantially equal in size, the transceiver transducers 205 may vary in size. For example, the transducers of sub-array 201 may be larger than the transducers of sub-array 202. The size of an acoustic wave produced by a single transducer is proportional to the size (i.e., to the membrane area) of that transducer.

Each of the transceiver transducers 205 of the array of transceiver transducers 200 is separately controllable by the sensor circuit 107. The transceiver transducers 205 may be individually excited, alone or in combination, as transmitters and may be individually configured, alone or in combination, for receiving ultrasound waves. When one or more transceiver transducers 205 are excited, each transceiver transducer 205 produces its own ultrasonic transmit wave with acoustic aperture or beam width (e.g., proportional to the size of the membrane). If two or more transceiver transducers 205 are activated simultaneously, their respective ultrasonic transmit waves combine either constructively or deconstructively via constructive or deconstructive interference to produce a combined (superimposed or compounded) ultrasonic transmit wave that has a main directivity lobe and possibly additional side lobes. The individual wavefronts may be spherical, but the individual wavefronts may combine in front of the array of transceiver transducers 200 to create a plane wave, which is a beam of ultrasonic waves travelling in a specific direction. The transmission direction or orientation angle of the main directivity lobe is said to correspond to the traveling direction of the plane wave. When only a single transmit transducer is activated, the main directivity lobe corresponds to the individual wavefront produced by that transmit transducer.

Whether one transceiver transducer 205 is excited or multiple transceiver transducers 205 are excited, the main directivity lobe has one or more directivity characteristics that can be adjusted by a controller. Directivity characteristics of the main directivity lobe includes transmission direction, orientation angle, acoustic aperture size, beam width, or beam height, among other examples. As a result, beam sizing, beam forming, and beam steering can be realized by modulating the activation of the transceiver transducers 205 to control the directivity characteristic of the main directivity lobe by selectively generating at least one respective excitation signal. Changing the directivity characteristic of the main directivity lobe changes the area of incidence of the main directivity lobe on the first interface 110 and the second interface 111.

A receiver circuit of the sensor circuit 107 is configured to receive at least one measurement signal generated by one or more transceiver transducers and determine whether a no-touch event or a touch event has occurred at the touch surface 104 based on at least one measurement signal received from the array of transceiver transducers 200. In some implementations, the receiver circuit may perform a signal amplitude threshold analysis by comparing the amplitude(s) of received measurement signal(s) with a threshold and determining whether a touch event or a no-touch event has occurred based on a result of the comparison.

The sensor circuit 107 further includes a controller (e.g., a microcontroller) configured to modulate an activation of the transceiver transducers 205 or the operating modes of the transceiver transducers 205.

As indicated above, FIG. 2 is provided as an example. Other examples may differ from what is described with regard to FIG. 2. In some implementations, additional circuit components may be added without deviating from the disclosure provided above.

Figure 3:
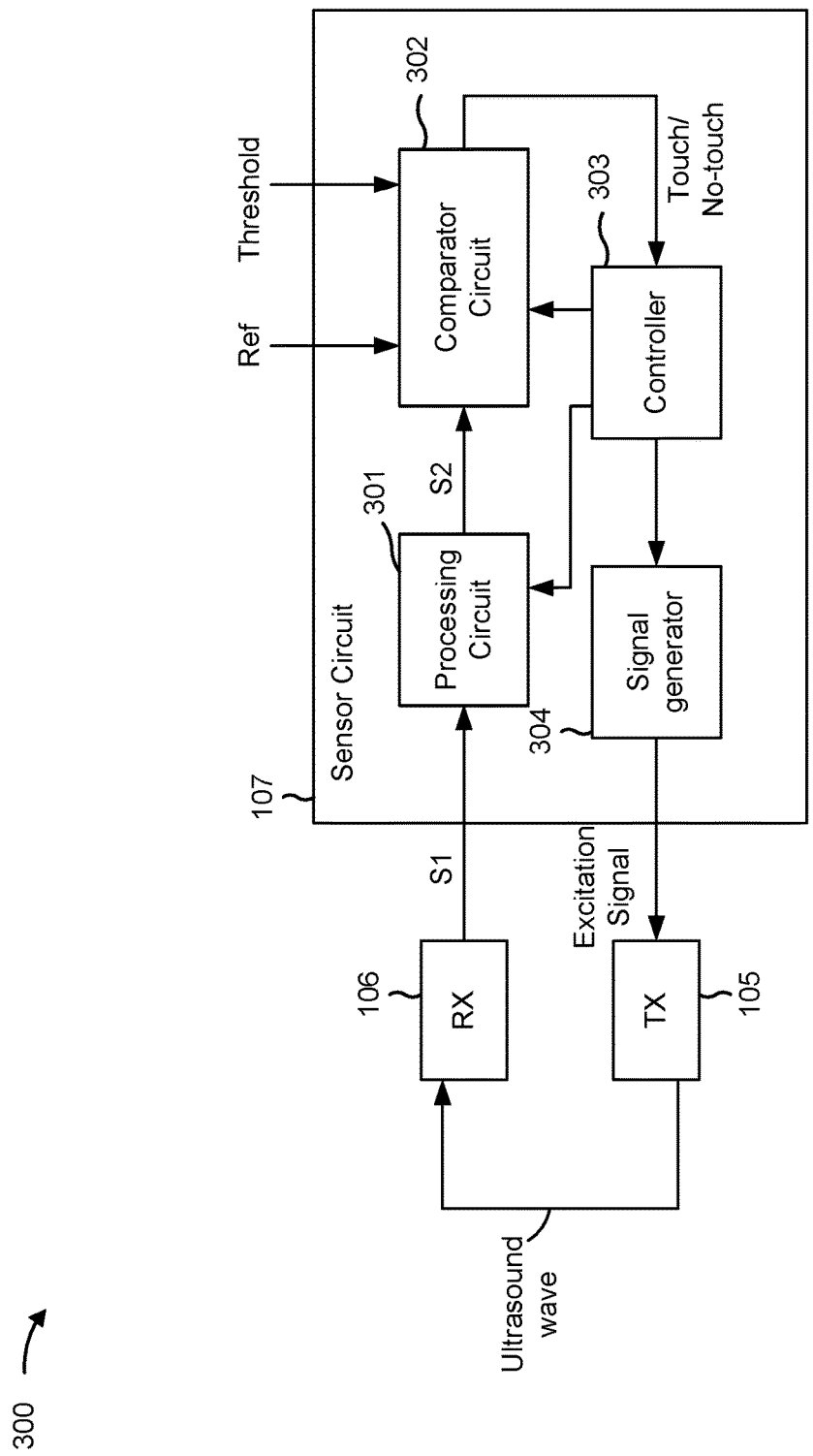
FIG. 3 illustrates a schematic block diagram of an ultrasonic touch sensor according to one or more implementations.

FIG. 3 illustrates a schematic block diagram of an ultrasonic touch sensor 300 according to one or more implementations. The ultrasonic touch sensor 300 is similar to the ultrasonic touch sensor 100 described above in conjunction with FIG. 1. The ultrasonic touch sensor 300 includes the transmitter 105 and the receiver 106. The transmitter 105 and the receiver 106 are acoustically coupled such that the receiver 106 receives reflected ultrasound waves (e.g., ultrasonic reflected waves 113 and 114) from an ultrasound wave (e.g., ultrasonic transmit wave 112) transmitted by the transmitter 105.

The ultrasonic touch sensor 300 also includes a sensor circuit 107 that is electrically coupled to the transmitter 105 and the receiver 106. In some implementations, the sensor circuit 107 includes a processing circuit 301, a comparator circuit 302, a controller 303, and a signal generator 304. The processing circuit 301 and the comparator circuit 302 may form a measurement circuit used for measuring signals and determining whether a no-touch event or a touch event has occurred at the touch surface 104.

In some implementations, the controller 303 may control (e.g., trigger) the signal generator 304 to generate an excitation signal and transmit the excitation signal to the transmitter 105. The transmitter 105 is configured to receive the excitation signal and transmit the ultrasonic transmit wave 112 toward the touch structure 102 based on the excitation signal.

The receiver 106 may be configured to generate a measurement signal S1 representative of an ultrasonic reflected wave (e.g., ultrasonic reflected wave 114), which may be evaluated during a corresponding observation window.

The processing circuit 301 is configured to process the measurement signal S1 in order to determine a feature of the measurement signal S1 and generate a measured value S2 based on the feature of the measurement signal S1. In some implementations, the processing circuit 301 may include at least one processor, included in the sensor circuit 107, that is configured to evaluate the feature of the measurement signal S1 in order to generate the measured value S2 that is representative of the feature of the measurement signal S1. The processor may include an analog processing circuit that operates in an analog domain, a digital processing circuit that operates in a digital domain, or both the analog processing circuit and the digital processing circuit, for evaluating the feature of the measurement signal S1 and for generating the measured value S2. Thus, the measured value S2 may be an analog value or a digital value.

The processor may be operable in combination with other processing components of the processing circuit 301 described herein to generate the measured value. For example, the processing circuit 301 may include an ADC that converts the measurement signal S1 into the digital domain for processing by a digital processor, such as a digital signal processor (DSP). The ADC may generate multiple digital samples (e.g., measurement samples) from the measurement signal S1 during the corresponding observation window and provide the multiple digital samples to the digital processor for processing. The processor may receive the multiple digital samples and generate the measured value S2 from one or more of the multiple digital samples.

In some implementations, the processing circuit 301 (e.g., the processor) may be configured to measure a function of an amplitude of the measurement signal S1 during the corresponding observation window to generate the measured value S2. For example, the measured value S2 may be a global extremum of the measurement signal S1 measured within a predetermined measurement interval (e.g., the corresponding observation window), a maximum peak-to-peak amplitude of the measurement signal S1 measured within the predetermined measurement interval, an average amplitude of the measurement signal S1 measured within the predetermined measurement interval, or a median amplitude of the measurement signal S1 measured within the predetermined measurement interval.

In some implementations, the processing circuit 301 (e.g., the processor) may be configured to calculate a distance of the measurement signal S1 relative to the reference signal during the corresponding observation window to generate the measured value S2. For example, the processing circuit 301 may calculate a Euclidean distance between the measurement signal S1 and the reference signal as the measured value S2, a squared Euclidean distance between the measurement signal S1 and the reference signal as the measured value S2, a Chebyshev distance between the measurement signal S1 and the reference signal as the measured value S2, a Manhattan distance between the measurement signal S1 and the reference signal as the measured value S2, or a Minkowski distance between the measurement signal S1 and the reference signal as the measured value S2.

The comparator circuit 302 is configured to perform a comparison of the measurement signal S1 with a threshold and determine whether a no-touch event or a touch event has occurred at the touch surface 104 based on whether the first measurement signal S1 satisfies the threshold. In some implementations, the comparator circuit 302 may compare the measured value S2 to the threshold, detect the no-touch event when the measured value S2 does not satisfy the threshold (e.g., the measured value S2 is equal to or greater than the threshold, the measured value S2 is greater than the threshold, or the measured value S2 does not satisfy another condition relative to the threshold), and detect the touch event when the measured value S2 satisfies the threshold (e.g., the measured value S2 is equal to or less than the threshold, the measured value S2 is less the threshold, or the measured value S2 satisfies another condition relative to the threshold).

In some implementations, the comparator circuit 302 may detect the no-touch event when a difference between the measured value S2 and a first reference value Ref does not satisfy the threshold (e.g., the difference is equal to or less than the threshold, the difference is less the threshold, or the difference satisfies another condition relative to the threshold), and detect the touch event when the difference between the measured value S2 and the reference value Ref satisfies the threshold (e.g., the difference is equal to or greater than the threshold, the difference is greater than the threshold, or the difference satisfies another condition relative to the threshold). For example, the comparator circuit 302 may calculate the difference between the measured value S2 and the reference value Ref for performing a comparison of the difference with the threshold for generating a comparison result.

If the sensor circuit 107 calculates the measured value S2 as the distance of the measurement signal S1 relative to the reference signal, the comparator circuit 302 may be configured to detect the no-touch event when the measured value S2 does not satisfy the threshold (e.g., the measured value is equal to or less than the threshold, the measured value is less the threshold, or the measured value satisfies another condition relative to the threshold), and may detect the touch event when the measured value satisfies the threshold (e.g., the measured value is equal to or greater than the threshold, the measured value is greater than the threshold, or the measured value satisfies another condition relative to the threshold).

The comparator circuit 302 is configured to make a touch/no-touch decision based on the comparison result. The comparator circuit 302 may transmit a decision output signal that is indicative of the touch/no-touch decision to the controller 303 that may be configured to perform additional actions or functions based on a result of the touch/no-touch decision.

As indicated above, FIG. 3 is provided as an example. Other examples may differ from what is described with regard to FIG. 3. The number and arrangement of components shown in FIG. 3 are provided as an example. In practice, the ultrasonic touch sensor 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the ultrasonic touch sensor 300 may perform one or more functions described as being performed by another set of components of the ultrasonic touch sensor 300. In some implementations, the ultrasonic touch sensor 300 may be configured to target any ultrasonic reflected wave for measurement that undergoes a change in response to a touch event (e.g., a direct touch event or an indirect touch event) occurrent at the touch surface 104 or a change in response to a change in touch environment. Such a configuration would enable the ultrasonic touch sensor 300 flexibility to accommodate different types of touch structures, different types of touch gestures, and/or different types of touch environments.

Figure 4:
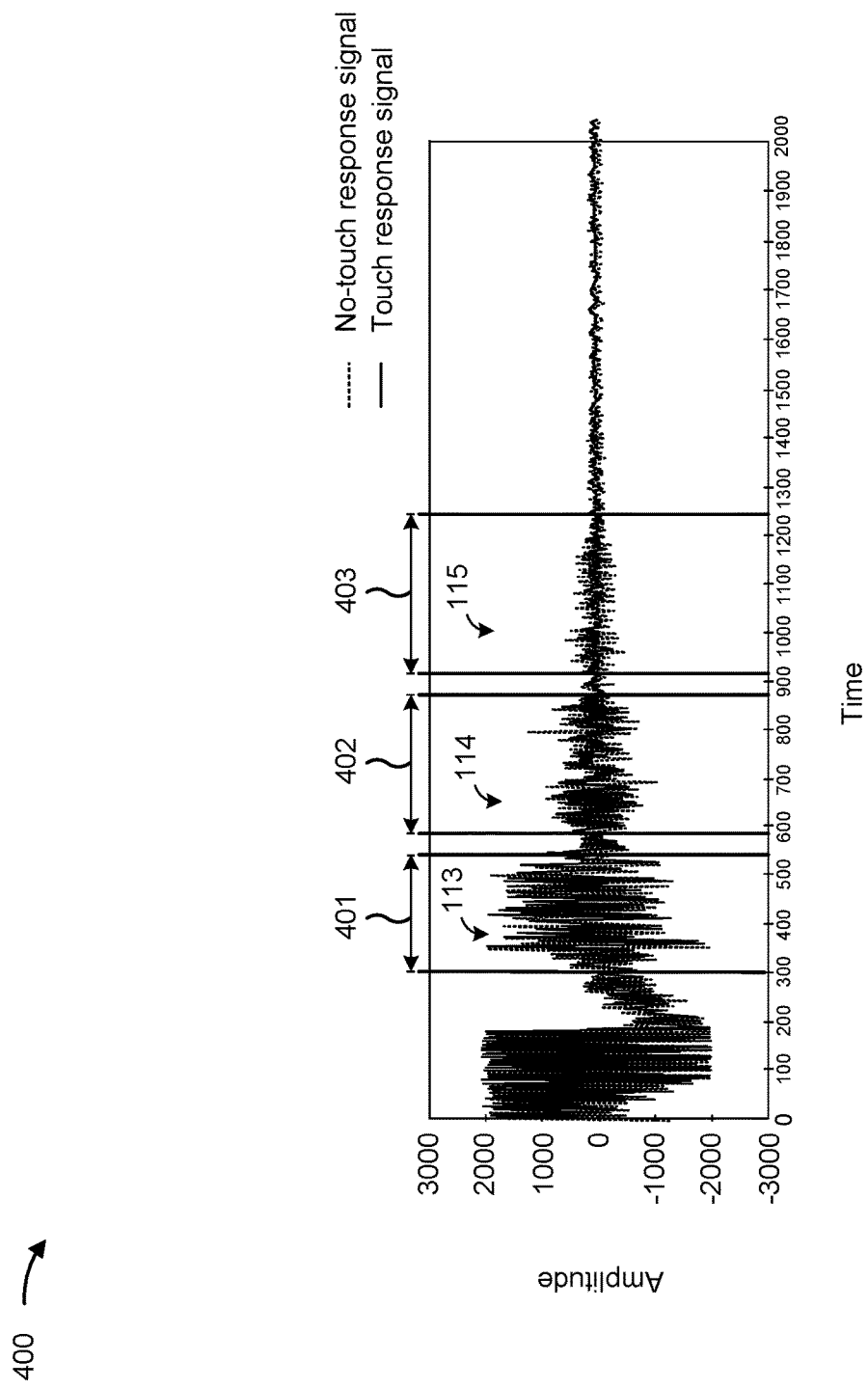
FIG. 4 illustrates a waveform diagram, including a no-touch response signal and a touch response signal, according to one or more implementations.

FIG. 4 illustrates a waveform diagram 400, including a no-touch response signal and a touch response signal, according to one or more implementations. The no-touch response signal is representative of ultrasonic reflected waves produced by reflection of a single ultrasonic transmit wave (e.g., the ultrasonic transmit wave 112) during a no-touch event and received by the receiver 106. In some implementations, a no-touch response signal recorded while configuring an ultrasonic touch sensor (e.g., during a calibration operation) may be used as a reference signal for making touch/no-touch decisions. The touch response signal is representative of ultrasonic reflected waves produced by reflection of a single ultrasonic transmit wave (e.g., the ultrasonic transmit wave 112) during a touch event and received by the receiver 106. Both the no-touch response signal and the touch response signal may be processed by the sensor circuit 107 as measurement signals (e.g., raw data). Thus, the waveform diagram 400 may illustrate a single excitation frame.

The ultrasonic reflected waves produced by reflection may include ultrasonic reflected waves 113 and 114. In addition, the ultrasonic reflected waves produced by reflection may include secondary reflections 115 produced by, for example, the second interface 111 due to multiple internal reflections within the touch structure 102. Accordingly, the secondary reflections 115 may be received by the receiver 106 after being reflected back by the second interface 111.

The ultrasonic reflected wave 113 may be received by the receiver 106 during a first observation window 401. Thus, the first observation window 401 is a time interval during which the ultrasonic reflected wave 113 corresponding to the ultrasonic transmit wave 112 is expected to be received by the receiver 106. The first observation window 401 may be configured based on time-of-flight. As a result, the first observation window 401 may be predetermined for each excitation frame. The sensor circuit 107 may be configured to sample a response signal (e.g., a measurement signal) during the first observation window 401 to measure and evaluate the ultrasonic reflected wave 113.

As noted above, the acoustic impedance change resulting from the touch event may be minimal at the first interface 110. As a result, the acoustic impedance change may not cause a measurable change in a property of the ultrasonic reflected wave 113. Thus, during the first observation window 401, the no-touch response signal and the touch response signal may be substantially similar to each other. While the ultrasonic reflected wave 113 may not be useful for making a touch/no-touch decision, the ultrasonic reflected wave 113 may be useful for calibrating the ultrasonic touch sensor.

The ultrasonic reflected wave 114 may be received by the receiver 106 during a second observation window 402. Thus, the second observation window 402 is a time interval during which the ultrasonic reflected wave 114 corresponding to the ultrasonic transmit wave 112 is expected to be received by the receiver 106. The second observation window 402 may be configured based on the principle of time-of-flight. As a result, the second observation window 402 may be predetermined for each excitation frame. The sensor circuit 107 may be configured to sample a response signal (e.g., a measurement signal) during the second observation window 402 to measure and evaluate the ultrasonic reflected wave 114.

During the second observation window 402, there may be a measurable amplitude change between the no-touch response signal and the touch response signal that can be evaluated by the sensor circuit 107 for making a touch/no-touch decision. For example, an amplitude of the ultrasonic reflected wave 114 may be reduced during a touch event in comparison to a no-touch event. The sensor circuit 107 may be configured to detect a reduction in amplitude of the touch response signal during the second observation window 402, to detect a touch. In addition, the ultrasonic reflected wave 114 may be useful for calibrating the ultrasonic touch sensor.

The secondary reflections 115 may be received by the receiver 106 during a third observation window 403. Thus, the third observation window 403 is a time interval during which the secondary reflections 115 corresponding to the ultrasonic transmit wave 112 are expected to be received by the receiver 106. The third observation window 403 may be configured based on the principle of time-of-flight. As a result, the third observation window 403 may be predetermined for each excitation frame. The sensor circuit 107 may be configured to sample a response signal (e.g., a measurement signal) during the third observation window 403 to measure and evaluate the secondary reflections 115. The secondary reflections 115 may be useful for calibrating the ultrasonic touch sensor. Furthermore, in some implementations, the secondary reflections 115 may be used by the sensor circuit 107 for making a touch/no-touch decision.

As indicated above, FIG. 4 is provided as an example. Other examples may differ from what is described with regard to FIG. 4.

Figure 5:
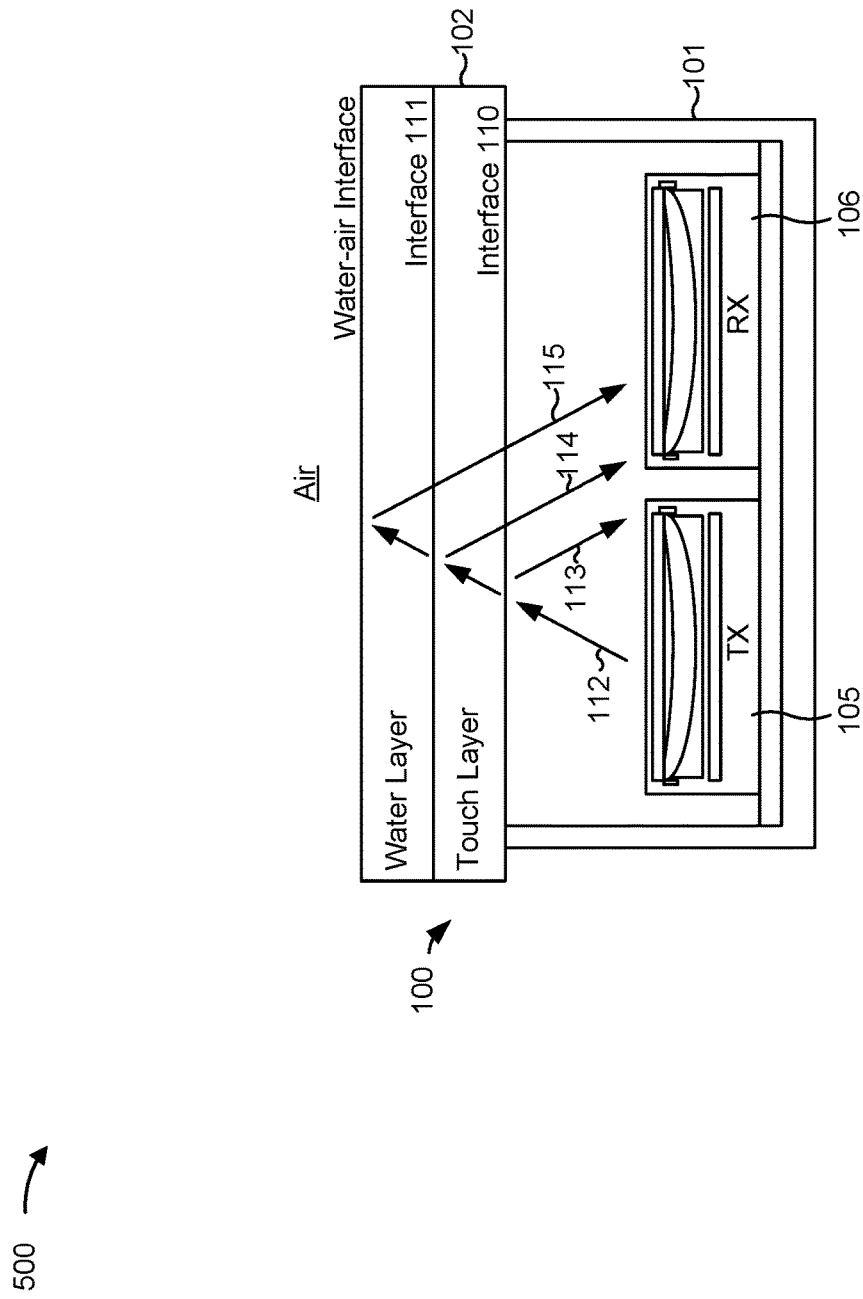
FIG. 5 illustrates a diagram of a touch sensor with a water layer formed at a touch surface of the touch sensor.

FIG. 5 illustrates a diagram 500 of a touch sensor with a water layer formed at a touch surface of the touch sensor. The touch sensor may be similar to the ultrasonic touch sensor 100 described in connection with FIG. 1. The water layer forms an additional interface (e.g., a water-air interface) on top of the second interface 111 (e.g., the touch interface). The water-air interface may produce additional reflections (e.g., secondary reflections 115). For example, the water-air interface may receive a portion of the ultrasonic transmit wave 112, and reflect a portion of the ultrasonic transmit wave 112 as a secondary reflection back into the ultrasound chamber 103 at the receiver 106. Thus, the water-air interface may behave as a third interface for the ultrasonic transmit wave 112, and the additional reflection of the ultrasonic transmit wave 112 at the water-air interface may be sensed at the receiver 106.

In addition, the one or more ultrasonic waves may bounce between the second interface 111 and the water-air interface. Each ultrasonic wave reflected by the water-air interface may be reflected back into the ultrasound chamber 103 at the receiver 106 as a secondary reflection. Thus, the water-air interface may behave as a fourth interface for additional secondary reflections that occur between the second interface 111 and the water-air interface. The additional secondary reflections caused by the presence of the water-air interface may be sensed at the receiver 106.

These additional reflections contain additional information regarding a presence of water, but the additional information is distributed between multiple interfaces (e.g., an initial reflection at the water-air interface, followed by additional secondary reflections occurring between the second interface 111 and the water-air interface and/or between the first interface 110 and the water-air interface). The additional reflections are visible in the measurement signal.

In addition, slight changes of the water layer may translate into significant and variable changes of the water-air interface and the secondary reflections produced by the water-air interface.

As indicated above, FIG. 5 is provided as an example. Other examples may differ from what is described with regard to FIG. 5.

Figure 6A:
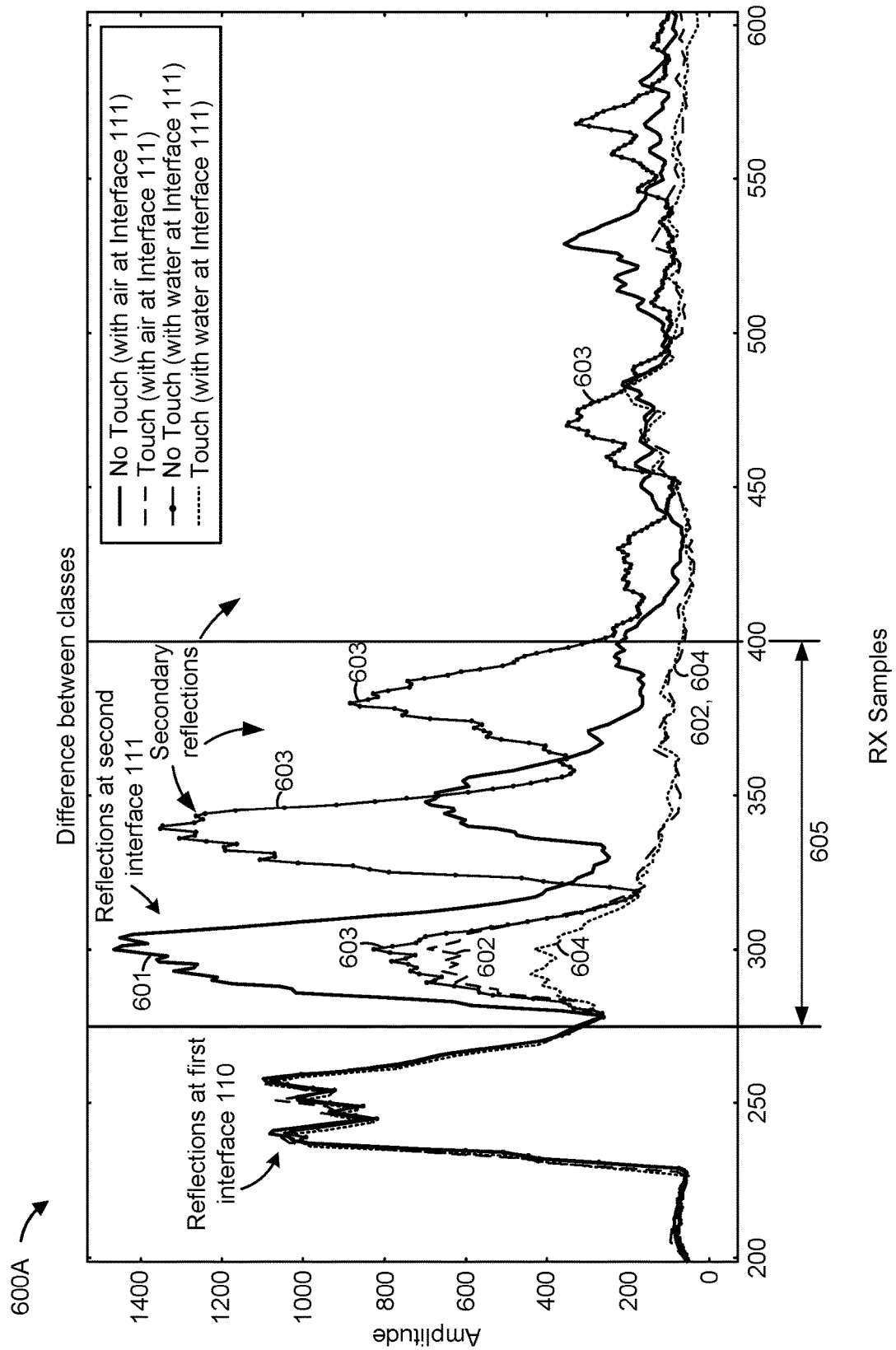
FIGS. 6A and 6B illustrate waveform diagrams according to one or more implementations.

FIG. 6A illustrates a waveform diagram 600A according to one or more implementations. The waveform diagram 600A includes a no-touch response signal 601 with air present at the second interface 111 (e.g., at the touch surface 104), a touch response signal 602 with air present at the second interface 111, a no-touch response signal 603 with water present at the second interface 111, and a touch response signal 604 with water present at the second interface 111. The water present at the second interface 111 may be due to water droplets formed on the touch surface 104 or a thin layer of water (or other liquid) formed on the touch surface 104. The no-touch response signals 601 and 603 may be representative of an envelope of ultrasonic reflected waves produced by reflection of a respective ultrasonic transmit wave (e.g., the ultrasonic transmit wave 112) during a no-touch event and received by the receiver 106. The touch response signals 602 and 604 may be representative of an envelope of ultrasonic reflected waves produced by reflection of a respective ultrasonic transmit wave (e.g., the ultrasonic transmit wave 112) during a touch event and received by the receiver 106. In some implementations, the no-touch response signal 601 may be recorded while configuring an ultrasonic touch sensor 300 (e.g., during a calibration operation) and may be used as a reference signal for making touch/no-touch decisions. Alternatively, the touch response signal 602 may be recorded while configuring the ultrasonic touch sensor 300 (e.g., during the calibration operation) and may be used as the reference signal for making touch/no-touch decisions. The no-touch response signals 601 and 603 and the touch response signals 602 and 604 may be processed by the sensor circuit 107 as measurement signals (e.g., raw data). Thus, the waveform diagram 600A may illustrate a single excitation frame.

In addition, the waveform diagram 600A indicates various reflections at various interfaces of the ultrasonic touch sensor 300, including reflections produced at the first interface 110, reflections produced at the second interface 111, and secondary reflections. The secondary reflections may be produced, at least in part, by the water-air interface. The reflections may be observed by the sensor circuit 107 during an observation window 605.

As indicated above, FIG. 6A is provided as an example. Other examples may differ from what is described with regard to FIG. 6A.

Figure 6B:
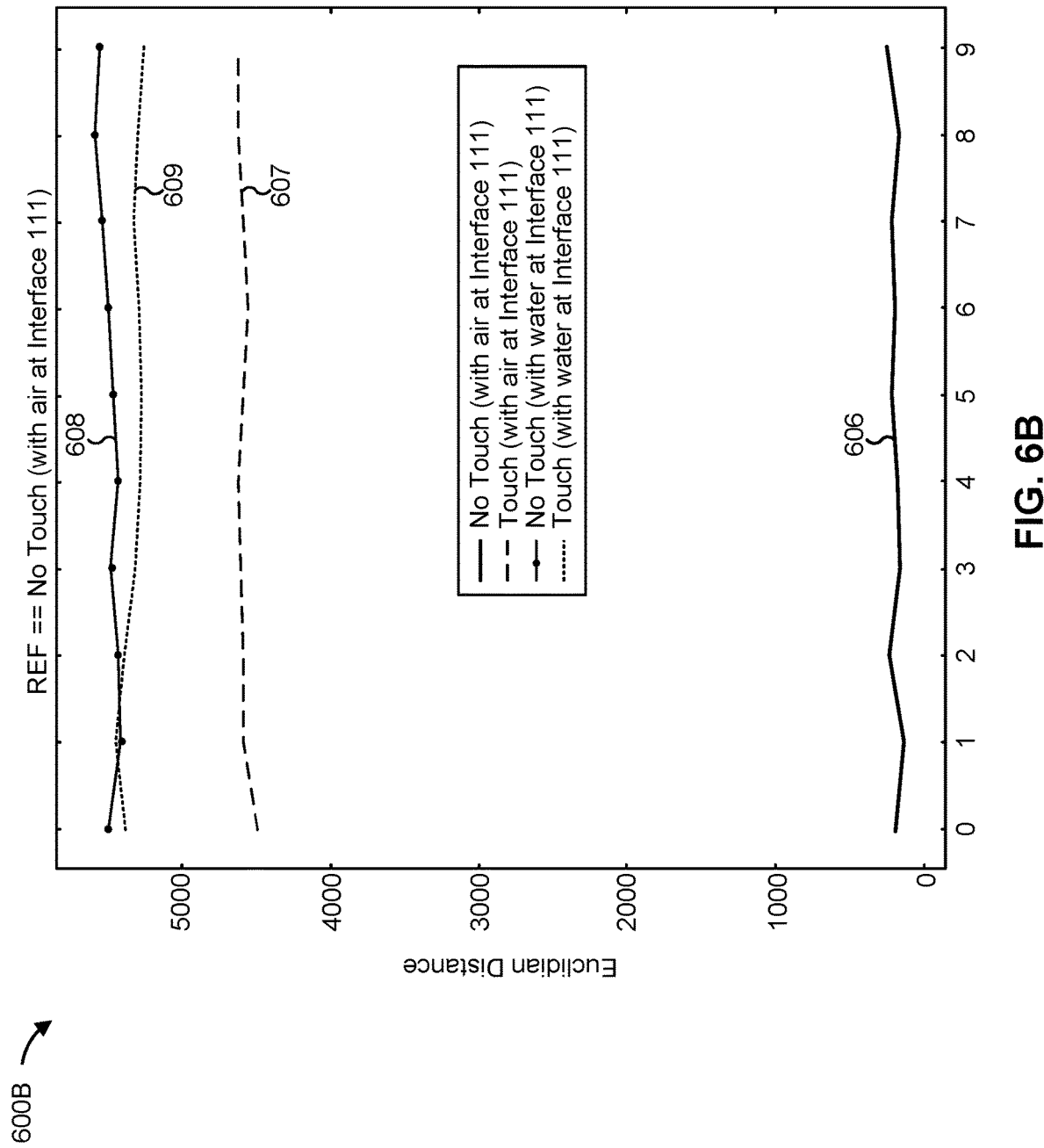

FIG. 6B illustrates a waveform diagram 600B according to one or more implementations. The waveform diagram 600B includes Euclidean distance signals 606-609 generated by the measurement circuit. The Euclidean distance signals 606-609 are computed based on samples acquired over an entire duration of the observation window 605.

The Euclidean distance signal 606 may be representative of a Euclidean distance of the no-touch response signal 601 to the reference signal (e.g., the no-touch response signal 601 recorded during a configuring of the ultrasonic touch sensor). Since the no-touch response signal 601 measured during operation should be similar to the no-touch response signal 601 recorded during the configuring, the Euclidean distance is small. The Euclidean distance signal 607 may be representative of the Euclidean distance of the touch response signal 602 to the reference signal. The Euclidean distance signal 608 may be representative of the Euclidean distance of the no-touch response signal 603 to the reference signal. The Euclidean distance signal 609 may be representative of the Euclidean distance of the touch response signal 604 to the reference signal. However, the Euclidean distance signal 608 (e.g., water-no touch) and the Euclidean distance signal 609 (e.g., water-touch) are too similar to discriminate between the two Euclidean distance signals 608 and 609 to make a touch/no-touch decision when water is present on the touch surface 104 and when using a wide observation window, such as the observation window 605. Thus, smaller observation windows should be used over a plurality of processing stages, along with a threshold decision algorithm, to distinguish between touch response signals from no-touch response signals when water is present on the touch surface 104. For example, the sensor circuit 107 may be configured to process the measurement signal separately for each interface (e.g., the second interface 111, the water-air interface as the third interface, and the water-air interface as the fourth interface) to make a touch/no-touch decision when water is present. Processed data from each interface may be used in combination to make a reliable touch/no-touch decision, even when water is present at the touch surface 104.

As indicated above, FIG. 6B is provided as an example. Other examples may differ from what is described with regard to FIG. 6B.

Figure 7A:
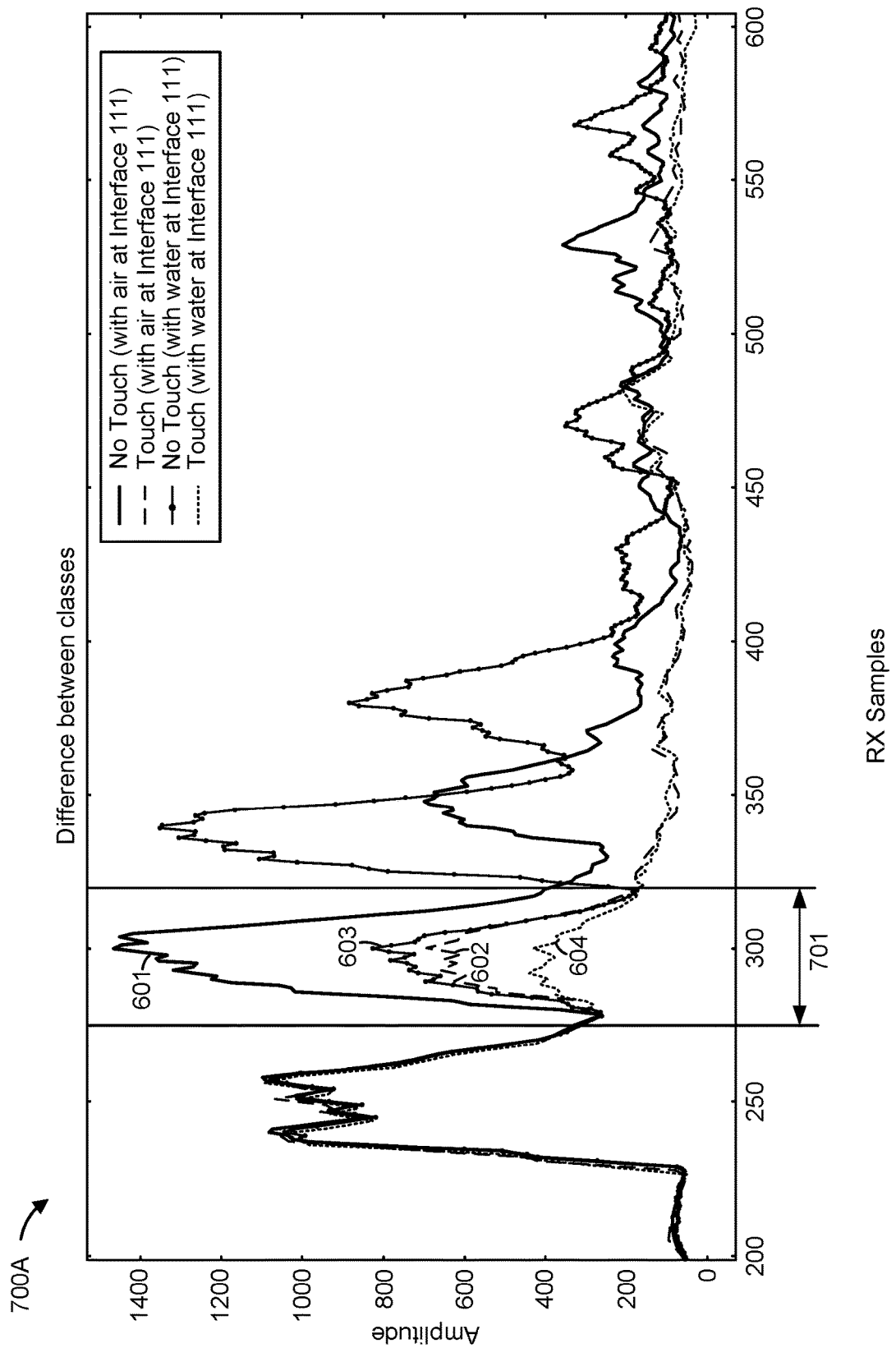
FIGS. 7A-7C illustrate waveform diagrams according to one or more implementations.
Figure 7B:
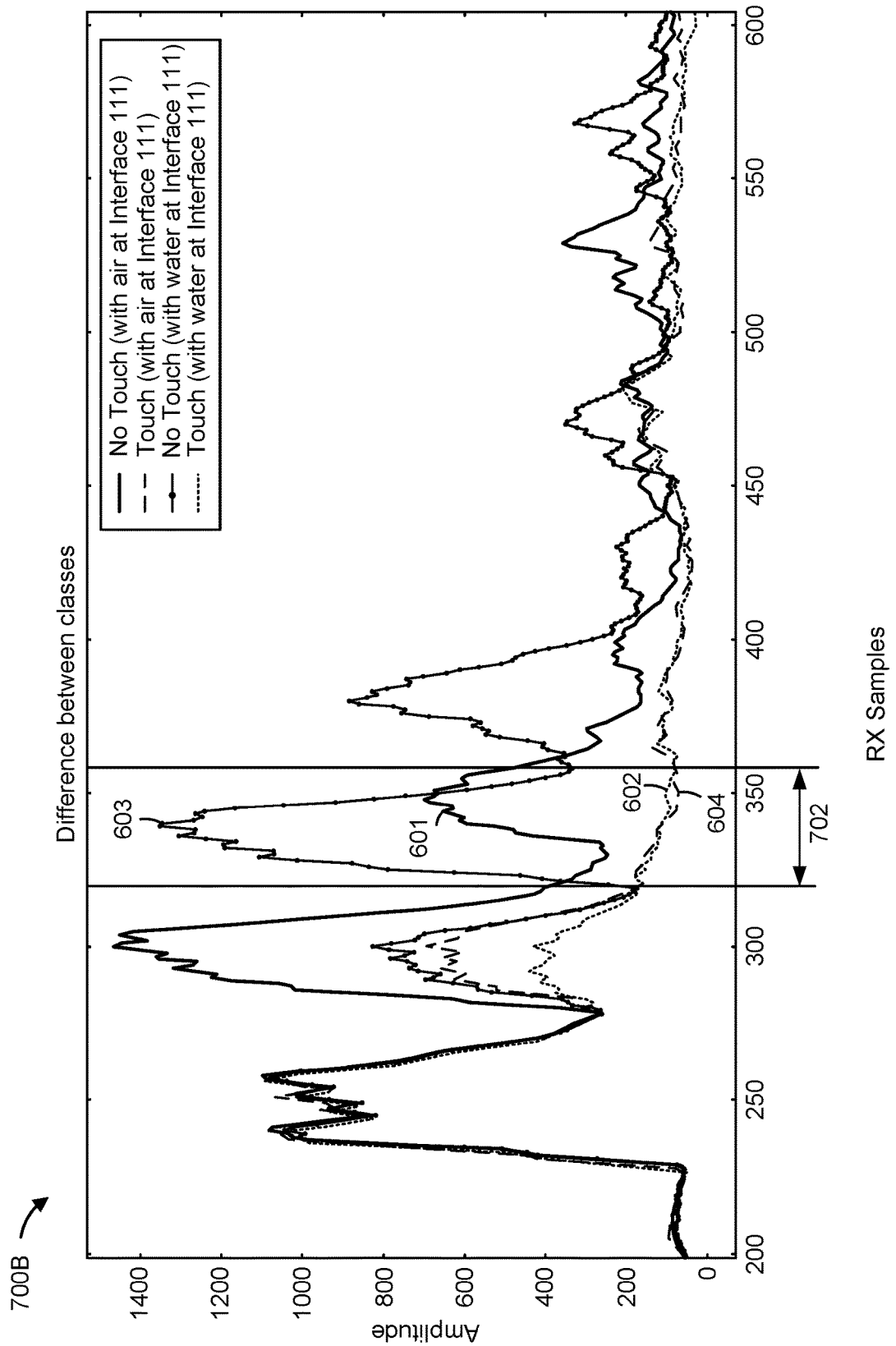
Figure 7C:
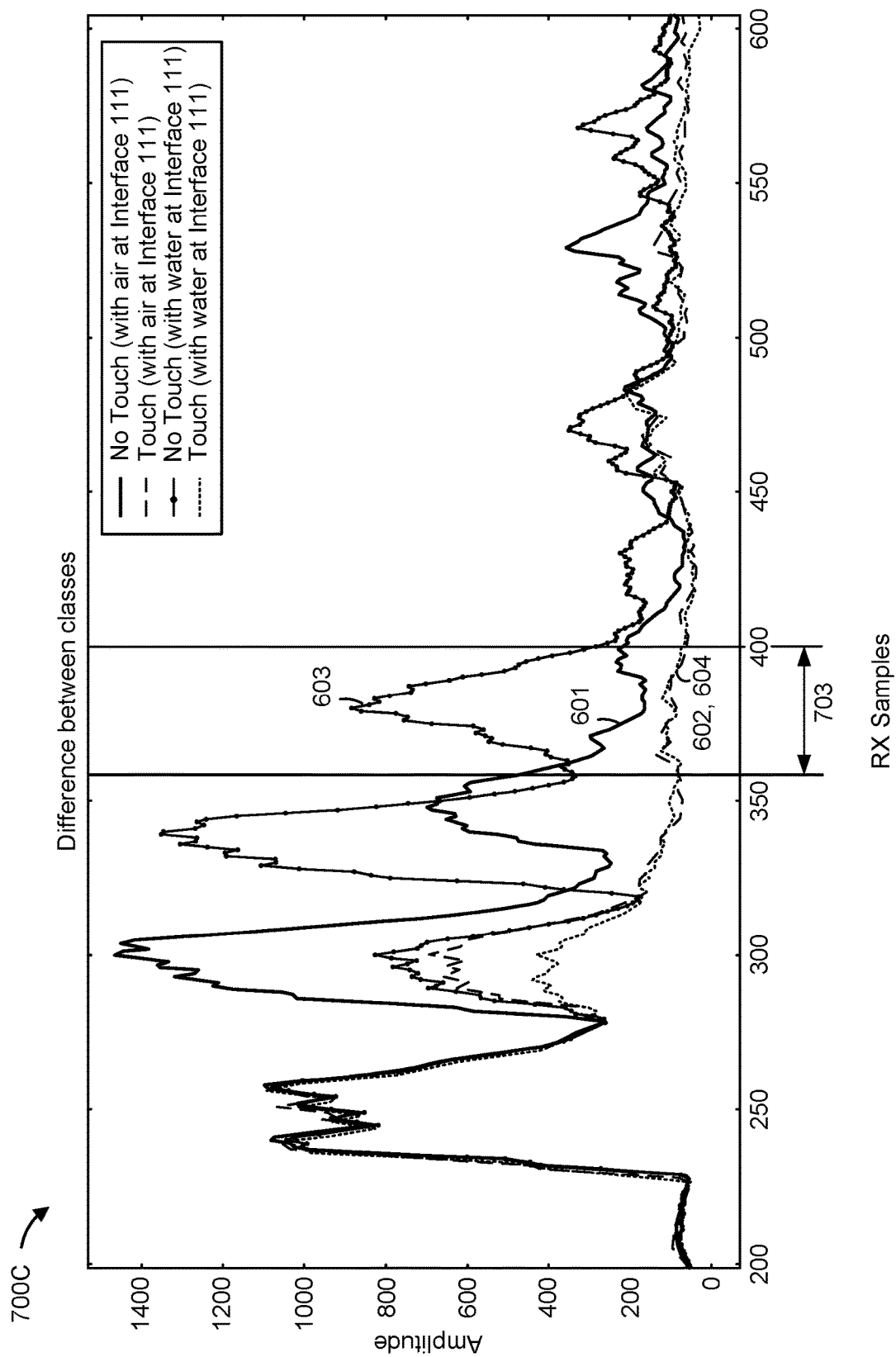

FIGS. 7A-7C illustrate waveform diagrams 700A-700C according to one or more implementations. The waveform diagram 700A shown in FIG. 7A is similar to the waveform diagram 600A, with the exception of that a first observation window 701 is used that is smaller than the observation window 605. The first observation window 701 may correspond to the ultrasonic reflected wave 114 produced by a reflection of the ultrasonic transmit wave 112 at the second interface 111 (e.g., the touch interface). Thus, while four response signals are shown (e.g., the no-touch response signal 601, with air present at the second interface 111, the touch response signal 602 with air present at the second interface 111, the no-touch response signal 603 with water present at the second interface 111, and the touch response signal 604 with water present at the second interface 111, only one of the response signals is present. The response signal may be used by the sensor circuit 107 as a measurement signal. For example, the measurement circuit (e.g., the processing circuit 301 and the comparator circuit 302) may acquire a first plurality of digital samples of the measurement signal during the first observation window 701, calculate a first distance value (e.g., a first Euclidean distance) of the first plurality of digital samples relative to a reference signal, and determine a first comparison result based on whether the first distance value satisfies a first threshold range. The first distance value of the first plurality of digital samples may be calculated relative to a first plurality of reference samples that correspond to the first observation window 701.

The waveform diagram 700B shown in FIG. 7B is similar to the waveform diagram 600A, with the exception of that a second observation window 702 is used that is smaller than the observation window 605. The second observation window 702 may be subsequent in time to the first observation window 701. For example, the second observation window 702 may correspond to a secondary reflection 115 (e.g., a secondary reflected wave) produced by a reflection of the ultrasonic transmit wave 112 at the water-air interface (e.g., the third interface). Thus, the second observation window 702 may correspond to a time interval during which the secondary reflection 115 from the third interface is expected to be received by the receiver 106 if water is present on the touch surface 104.

The measurement circuit may acquire a second plurality of digital samples of the measurement signal during the second observation window 702, calculate a second distance value (e.g., a second Euclidean distance) of the second plurality of digital samples relative to a reference signal, and determine a second comparison result based on whether the second distance value satisfies a second threshold range. The second distance value of the second plurality of digital samples may be calculated relative to a second plurality of reference samples that correspond to the second observation window 702. In this example, the measurement signal sampled during the second observation window 702 is a continuation of the measurement signal sampled during the first observation window 701.

The waveform diagram 700C shown in FIG. 7C is similar to the waveform diagram 600A, with the exception of that a third observation window 703 is used that is smaller than the observation window 605. The third observation window 703 may be subsequent in time to the second observation window 702. For example, the third observation window 703 may correspond to an additional secondary reflection 115 (e.g., an additional secondary reflected wave) produced by a reflection of the ultrasonic transmit wave 112 at the water-air interface (e.g., the fourth interface). Thus, the third observation window 703 may correspond to a time interval during which the additional secondary reflection 115 from the fourth interface is expected to be received by the receiver 106 if water is present on the touch surface 104.

In order to calculate a Euclidean distance, the reference signal may include a plurality of reference samples that are stored in a memory device of the ultrasonic touch sensor 300. The reference signal may correspond to a reference no-touch event or to a reference touch event. In other words, the plurality of reference samples of the no-touch response signal 601 may be recorded while configuring the ultrasonic touch sensor 300 (e.g., during the calibration operation). Alternatively, the plurality of reference samples of the touch response signal 602 may be recorded while configuring the ultrasonic touch sensor 300 (e.g., during the calibration operation).

The measurement circuit may acquire a third plurality of digital samples of the measurement signal during the third observation window 703, calculate a third distance value (e.g., a third Euclidean distance) of the third plurality of digital samples relative to a reference signal, and determine a third comparison result based on whether the third distance value satisfies a third threshold range. In this example, the measurement signal sampled during the third observation window 703 is a continuation of the measurement signal sampled during the first observation window 701 and the second observation window 702.

The first threshold range, the second threshold range, and the third threshold range may different threshold ranges.

The measurement circuit may determine whether a no-touch event or a touch event has occurred at the touch surface 104 based at least two comparison results of the first comparison result, the second comparison result, and the third comparison result. For example, in some implementations, the measurement circuit may determine whether the no-touch event or the touch event has occurred based on the first comparison result and the second comparison. Thus, the measurement circuit may determine whether the no-touch event or the touch event has occurred based on the first distance value and the second distance value. Alternatively, the measurement circuit may determine whether the no-touch event or the touch event has occurred based on the first comparison result, the second comparison result, and the third comparison result.

As indicated above, FIGS. 7A-7C are provided as an example. Other examples may differ from what is described with regard to FIGS. 7A-7C.

Figure 8:
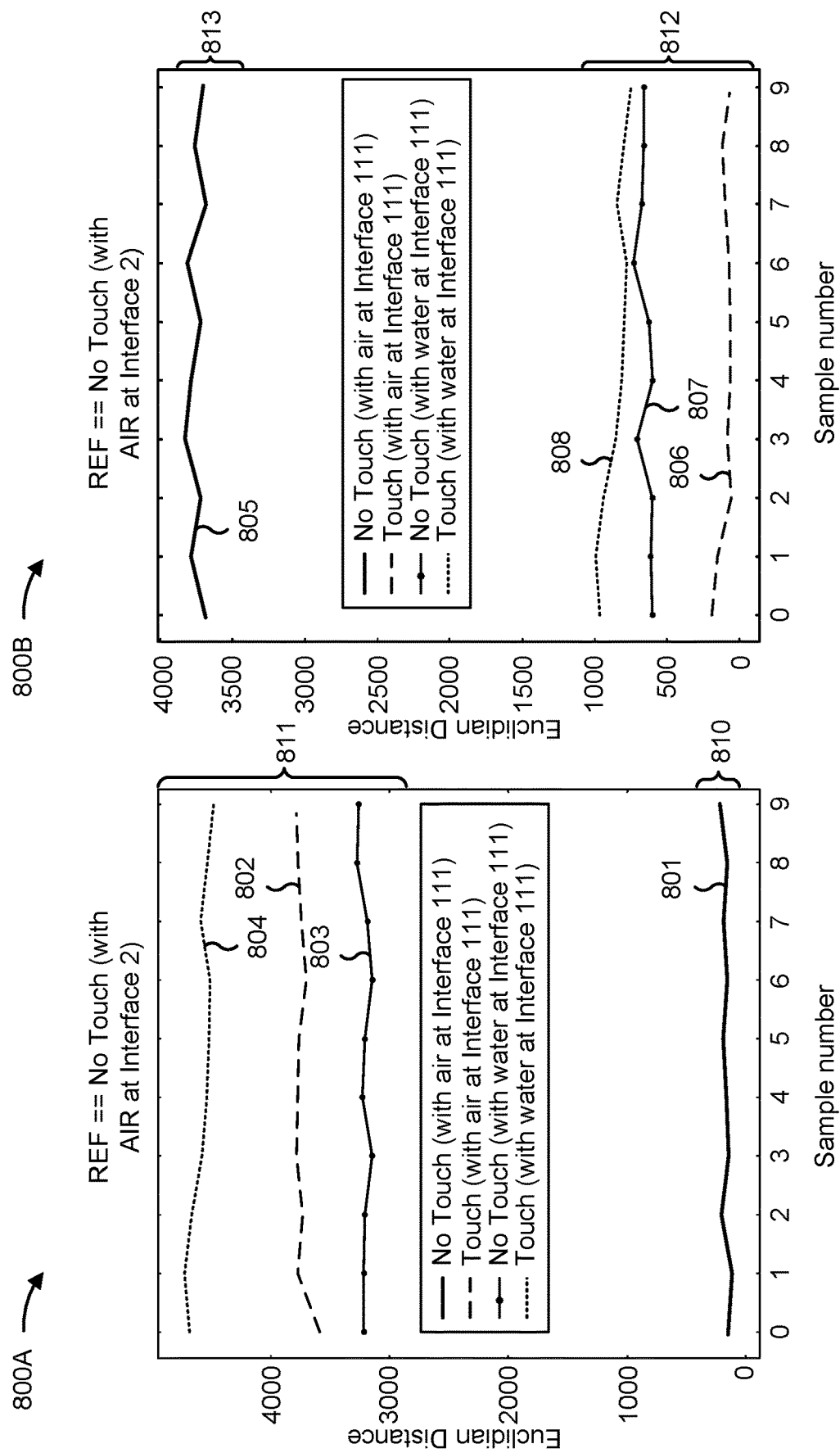
FIG. 8 illustrates waveform diagrams.

FIG. 8 illustrates waveform diagrams 800A and 800B. The waveform diagrams 800A includes Euclidean distance signals 801-804 generated by the measurement circuit in refence to the reference signal corresponding to the reference no-touch event. The waveform diagrams 800B includes Euclidean distance signals 805-808 generated by the measurement circuit in refence to the reference signal corresponding to the reference touch event. The Euclidean distance signals 801-808 are computed based on samples (e.g., the first plurality of samples) acquired during the first observation window 701.

The Euclidean distance signal 801 may be representative of a Euclidean distance of the no-touch response signal 601 to the reference signal (e.g., the no-touch response signal 601 recorded during a configuring of the ultrasonic touch sensor). Since the no-touch response signal 601 measured during operation should be similar to the no-touch response signal 601 recorded during the configuring, the Euclidean distance is small. The Euclidean distance signal 802 may be representative of the Euclidean distance of the touch response signal 602 to the reference signal. The Euclidean distance signal 803 may be representative of the Euclidean distance of the no-touch response signal 603 to the reference signal. The Euclidean distance signal 804 may be representative of the Euclidean distance of the touch response signal 604 to the reference signal.

The Euclidean distance signal 805 may be representative of a Euclidean distance of the no-touch response signal 601 to the reference signal (e.g., the touch response signal 602 recorded during a configuring of the ultrasonic touch sensor). Since the no-touch response signal 601 measured during operation should be the most dissimilar to the touch response signal 602 recorded during the configuring, the Euclidean distance is large. The Euclidean distance signal 806 may be representative of the Euclidean distance of the touch response signal 602 to the reference signal. The Euclidean distance signal 807 may be representative of the Euclidean distance of the no-touch response signal 603 to the reference signal. The Euclidean distance signal 808 may be representative of the Euclidean distance of the touch response signal 604 to the reference signal.

In the waveform diagram 800A, there is a clear separation between the Euclidean distance signal 801 and the other Euclidean distance signals 802-804. For example, the Euclidean distance signal 801 and the other Euclidean distance signals 802-804 may be located in different threshold ranges 810 and 811. Thus, if the first distance value calculated by the measurement circuit is in the threshold range 810, the measurement circuit may determine that the measurement signal corresponds to an air no-touch signal. However, if the first distance value calculated by the measurement circuit is in the threshold range 811, the measurement circuit may determine that the measurement signal corresponds to either an air touch signal, a water no-touch signal, or a water touch signal. In other words, if the first distance value calculated by the measurement circuit is in the threshold range 811, the measurement circuit can exclude the measurement signal from being the air no-touch signal.

In the waveform diagram 800B, there is a clear separation between the Euclidean distance signal 805 and the other Euclidean distance signals 806-808. For example, the Euclidean distance signal 805 and the other Euclidean distance signals 806-808 may be located in different threshold ranges 812 and 813. Thus, if the first distance value calculated by the measurement circuit is in the threshold range 813, the measurement circuit may determine that the measurement signal corresponds to the air no-touch signal. However, if the first distance value calculated by the measurement circuit is in the threshold range 812, the measurement circuit may determine that the measurement signal corresponds to either the air touch signal, the water no-touch signal, or the water touch signal. In other words, if the first distance value calculated by the measurement circuit is in the threshold range 812, the measurement circuit can exclude the measurement signal from being the air no-touch signal.

As indicated above, FIG. 8 is provided as an example. Other examples may differ from what is described with regard to FIG. 8.

Figure 9:
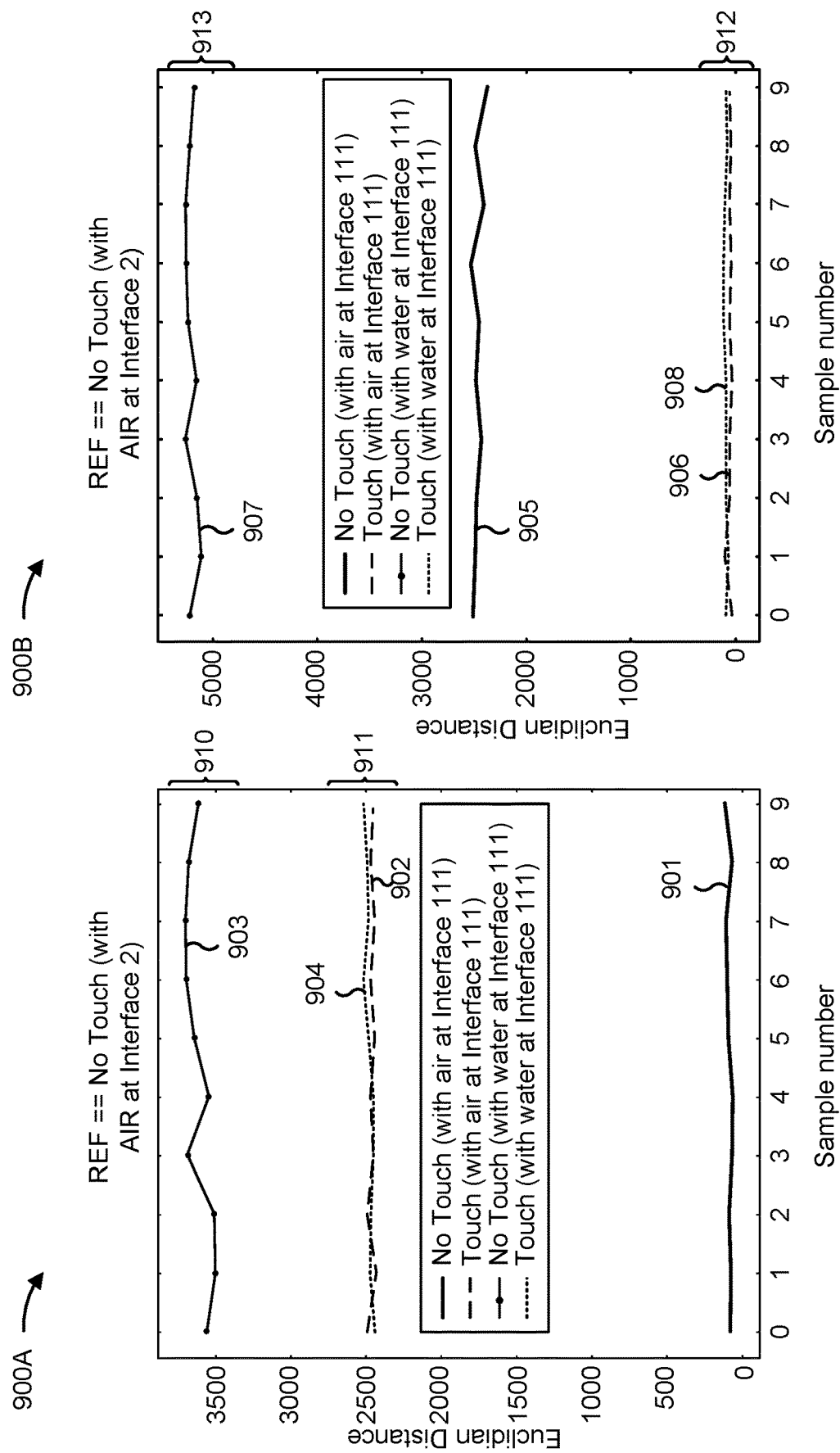
FIG. 9 illustrates waveform diagrams.

FIG. 9 illustrates waveform diagrams 900A and 900B. The waveform diagrams 900A includes Euclidean distance signals 901-904 generated by the measurement circuit in refence to the reference signal corresponding to the reference no-touch event. The waveform diagrams 900B includes Euclidean distance signals 905-908 generated by the measurement circuit in refence to the reference signal corresponding to the reference touch event. The Euclidean distance signals 901-908 are computed based on samples (e.g., the second plurality of samples) acquired during the second observation window 702.

It may be assumed that the first distance value calculated by the measurement circuit was determined to be in either the threshold range 811 in the waveform diagram 800A or in the threshold range 812 in the waveform diagram 800B. Thus, it may be assumed that the measurement circuit has determined that the measurement signal does not correspond to the air no-touch signal. Thus, the Euclidean distance signals 901 and 905 can be ignored in this example as being excluded.

In the waveform diagram 900A, there is a clear separation between the Euclidean distance signal 903 and the other Euclidean distance signals 902 and 904. For example, the Euclidean distance signal 903 and the other Euclidean distance signals 902 and 904 may be located in different threshold ranges 910 and 911. Thus, if the second distance value calculated by the measurement circuit is in the threshold range 910, the measurement circuit may determine that the measurement signal corresponds to a water no-touch signal. However, if the second distance value calculated by the measurement circuit is in the threshold range 911, the measurement circuit may determine that the measurement signal corresponds to either an air touch signal or a water touch signal. In other words, if the second distance value calculated by the measurement circuit is in the threshold range 911, the measurement circuit can exclude the measurement signal from being the water no-touch signal.

In the waveform diagram 900B, there is a clear separation between the Euclidean distance signal 907 and the other Euclidean distance signals 906 and 908. For example, the Euclidean distance signal 907 and the other Euclidean distance signals 906 and 908 may be located in different threshold ranges 912 and 913. Thus, if the second distance value calculated by the measurement circuit is in the threshold range 913, the measurement circuit may determine that the measurement signal corresponds to the water no-touch signal. However, if the second distance value calculated by the measurement circuit is in the threshold range 912, the measurement circuit may determine that the measurement signal corresponds to either the air touch signal or the water touch signal. In other words, if the second distance value calculated by the measurement circuit is in the threshold range 912, the measurement circuit can exclude the measurement signal from being the water no-touch signal. As a result, only touch possibilities (e.g., an air touch or a water touch) remain, and the measurement circuit may detect that a touch event has occurred.

As indicated above, FIG. 9 is provided as an example. Other examples may differ from what is described with regard to FIG. 9.

Figure 10:
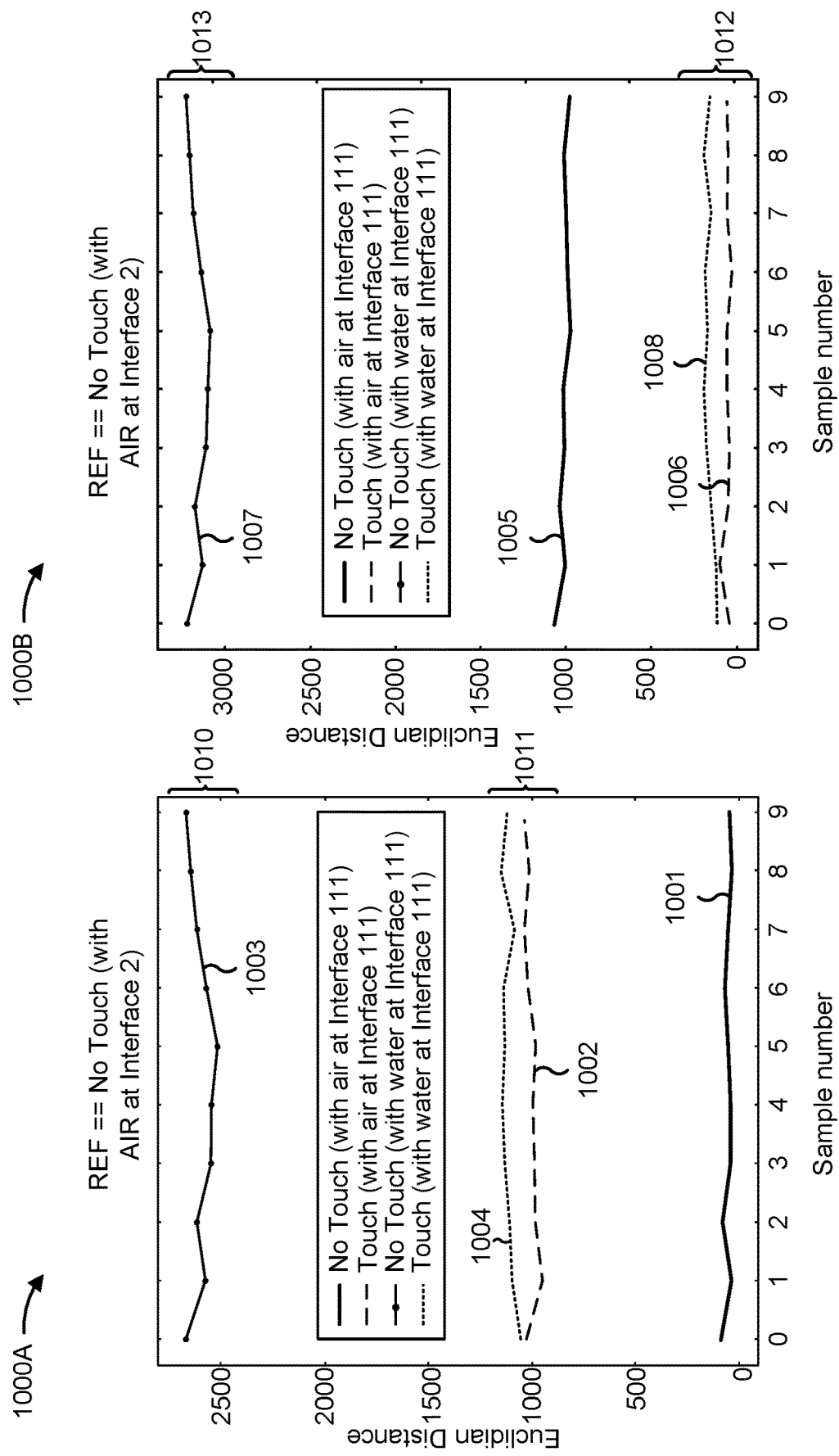
FIG. 10 illustrates waveform diagrams.

FIG. 10 illustrates waveform diagrams 1000A and 1000B. The waveform diagrams 1000A includes Euclidean distance signals 1001-1004 generated by the measurement circuit in refence to the reference signal corresponding to the reference no-touch event. The waveform diagrams 1000B includes Euclidean distance signals 1005-1008 generated by the measurement circuit in refence to the reference signal corresponding to the reference touch event. The Euclidean distance signals 1001-1008 are computed based on samples (e.g., the second plurality of samples) acquired during the third observation window 703.

It may be assumed that the first distance value calculated by the measurement circuit was determined to be in either the threshold range 811 in the waveform diagram 800A or in the threshold range 812 in the waveform diagram 800B. Thus, it may be assumed that the measurement circuit has determined that the measurement signal does not correspond to the air no-touch signal. Thus, the Euclidean distance signals 1001 and 1005 can be ignored in this example as being excluded.

In the waveform diagram 1000A, there is a clear separation between the Euclidean distance signal 1003 and the other Euclidean distance signals 1002 and 1004. For example, the Euclidean distance signal 1003 and the other Euclidean distance signals 1002 and 1004 may be located in different threshold ranges 1010 and 1011. Thus, if the third distance value calculated by the measurement circuit is in the threshold range 1010, the measurement circuit may determine that the measurement signal corresponds to the water no-touch signal. In other words, the measurement circuit may confirm that measurement signal corresponds to the water no-touch signal. However, if the third distance value calculated by the measurement circuit is in the threshold range 1011, the measurement circuit may determine that the measurement signal corresponds to either the air touch signal or the water touch signal. In other words, the measurement circuit may confirm that measurement signal corresponds to the touch event. Thus, the measurement circuit may use the third distance value verify the touch/no-touch decision made based on the third distance value.

In the waveform diagram 1000B, there is a clear separation between the Euclidean distance signal 1007 and the other Euclidean distance signals 1006 and 1008. For example, the Euclidean distance signal 1007 and the other Euclidean distance signals 1006 and 1008 may be located in different threshold ranges 1012 and 1013. Thus, if the third distance value calculated by the measurement circuit is in the threshold range 1013, the measurement circuit may determine that the measurement signal corresponds to the water no-touch signal. However, if the third distance value calculated by the measurement circuit is in the threshold range 1012, the measurement circuit may determine that the measurement signal corresponds to either the air touch signal or the water touch signal. In other words, the measurement circuit may confirm that measurement signal corresponds to the touch event. Thus, the measurement circuit may use the third distance value verify the touch/no-touch decision made based on the third distance value.

As indicated above, FIG. 10 is provided as an example. Other examples may differ from what is described with regard to FIG. 10.

Figure 11:
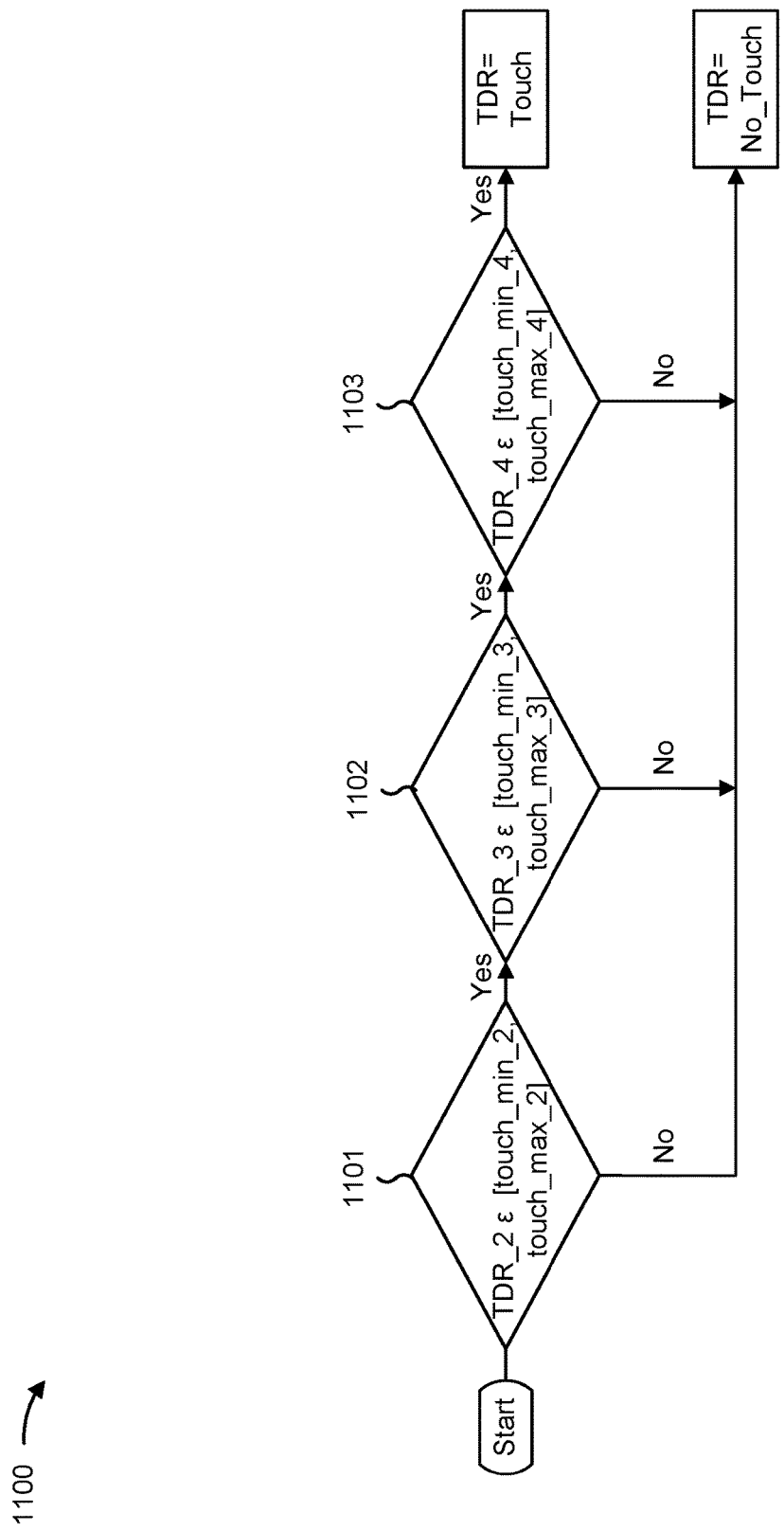
FIG. 11 illustrates a process for making a touch/no-touch decision according to one or more implementations.

FIG. 11 illustrates a process 1100 for making a touch/no-touch decision according to one or more implementations. The process 1100 may correspond to or includes a threshold decision algorithm. Touch decision results (TDR) are denoted as TDR_x, wherein x stands for an interface number. Thus, TDR_2 denotes a touch decision result for the second interface 111, TDR 3 denotes a touch decision result for the water-air interface acting as the third interface, and TDR_4 denotes a touch decision result for the water-air interface acting as the fourth interface. In addition, a first threshold range for the second interface 111 is denoted touch_min_2, touch_max_2, where touch_min_2 is a lower threshold of the threshold range and touch_max_2 is the upper threshold of the threshold range. A second threshold range for the third interface is denoted touch_min_3, touch_max_3, where touch_min_3 is a lower threshold of the threshold range and touch_max_3 is the upper threshold of the threshold range. A third threshold range for the fourth interface is denoted touch_min_4, touch_max_4, where touch_min_4 is a lower threshold of the threshold range and touch_max_4 is the upper threshold of the threshold range. An upper threshold may correspond to a maximum value and a lower threshold may correspond to a minimum value.

The process 1100 may include making a first TDR (block 1101), corresponding to the first observation window 701. Thus, the block 1101 may correspond to a process described in connection with FIG. 8. The process 1100 may include making a second TDR (block 1102), corresponding to the second observation window 702. Thus, the block 1102 may correspond to a process described in connection with FIG. 9. The process 1100 may include making a third TDR (block 1103), corresponding to the third observation window 703. Thus, the block 1103 may correspond to a process described in connection with FIG. 10.

For example, in block 1101, the measurement circuit may determine whether the first distance value is in the first threshold range. If NO, the measurement circuit may determine that a no-touch event has occurred. If YES, the measurement circuit may proceed to block 1102.

In block 1102, the measurement circuit may determine whether the second distance value is in the second threshold range. If NO, the measurement circuit may determine that a no-touch event has occurred. If YES, the measurement circuit may proceed to block 1103.

In block 1103, the measurement circuit may determine whether the third distance value is in the third threshold range. If NO, the measurement circuit may determine that a no-touch event has occurred. If YES, the measurement circuit may determine that a touch event has occurred.

In some implementations, the measurement circuit may apply different weights to each touch decision result TDR_x. For example, each touch decision result TDR_x may be amplified by a dynamically-computed weighted factor. The processing circuit 301 may compute the dynamically-computed weighted factor based on how robust each individual touch decision result TDR_x is (e.g., based on a difference between a respective distance value and a respective minimum value). For example, the measurement circuit may apply a first weighted factor to the first comparison result determined in block 1101. The measurement circuit may calculate the first weighted factor based on a first difference between the first distance value and a first minimum value (e.g., touch_min_2) that corresponds to a minimum of the first threshold range to generate a first weighed comparison result. For example, the first weighted factor may be larger when the first difference is smaller, and the first weighted factor may be smaller when the first difference is larger. In other words, the first weighted factor may be inversely proportional to the first difference.

The measurement circuit may apply a second weighted factor to the second comparison result determined in block 1102. The measurement circuit may calculate the second weighted factor based on a second difference between the second distance value and a second minimum value (e.g., touch_min_3) that corresponds to a minimum of the second threshold range to generate a second weighed comparison result. For example, the second weighted factor may be larger when the second difference is smaller, and the second weighted factor may be smaller when the second difference is larger. In other words, the second weighted factor may be inversely proportional to the second difference. The comparator circuit 302 may determine whether a no-touch event or a touch event has occurred based on the first weighed comparison result and the second weighed comparison result. In some implementations, the comparator circuit 302 may detect a presence of water on the touch surface based on the first comparison result and the second comparison result. For example, threshold ranges in blocks 1101 and 1102 could be applied that separate air signals (e.g., air touch and air no-touch) from water signals (e.g., water touch and water no-touch). Thus, the comparator circuit 302 may determine whether the measurement signal corresponds to an air signal or a water signal based on a process of elimination using the threshold ranges.

Additionally, the measurement circuit may apply a third weighted factor to the third comparison result determined in block 1103. The measurement circuit may calculate the second weighted factor based on a third difference between the third distance value and a third minimum value (e.g., touch_min_4) that corresponds to a minimum of the third threshold range to generate a third weighed comparison result. The comparator circuit 302 may determine whether a no-touch event or a touch event has occurred based on the first weighed comparison result, the second weighed comparison result, and the third weighed comparison result. In some implementations, the comparator circuit 302 may detect a presence of water on the touch surface based on the first comparison result and the second comparison result. For example, threshold ranges in blocks 1101-1103 could be applied that separate air signals (e.g., air touch and air no-touch) from water signals (e.g., water touch and water no-touch). Thus, the comparator circuit 302 may determine whether the measurement signal corresponds to an air signal or a water signal based on a process of elimination using the threshold ranges.

In some implementations, the measurement circuit may invalidate a touch decision, made based solely on the first comparison result, based on the second comparison result and/or the third comparison result. For example, the measurement circuit may make an initial touch decision (e.g., determining that a touch event has occurred) based on the first comparison result. Referring to the waveform diagram 800A in FIG. 8, both Euclidean distance signals 802 and 804 corresponding to touch response signals 602 and 604, respectively, may be in a separate threshold range from the Euclidean distance signals 801 and 803 corresponding to no-touch response signals 601 and 603. Thus, the comparator circuit 302 may determine at block 1101 that a touch event has occurred. The comparator circuit 302 may validate or invalidate the initial touch decision based on block 1102 and/or block 1103. In some implementations, the comparator circuit 302 may validate or invalidate the initial touch decision based on detecting a presence of water on the touch surface 104. For example, if the comparator circuit 302 detects the presence of water on the touch surface 104, the comparator circuit 302 may invalidate the initial touch decision and change the initial touch decision to a no-touch decision. For example, the initial touch decision may have been caused by water contact (e.g., a water droplet coming in contact with the touch surface 104). Thus, by detecting the presence of water after the initial touch decision, the comparator circuit 302 may determine that the initial touch decision was a false positive.

In some implementations, a touch event can be detected as soon as a touch is contact is made at the water-air interface. In other words, the measurement circuit does not have to wait for contact to be made at the second interface 111.

In some implementations, the comparator circuit 302 may use machine learning for make the touch/no-touch decision and/or detect the presence of water.

As indicated above, FIG. 11 is provided as an example. Other examples may differ from what is described with regard to FIG. 11.

Figure 12:
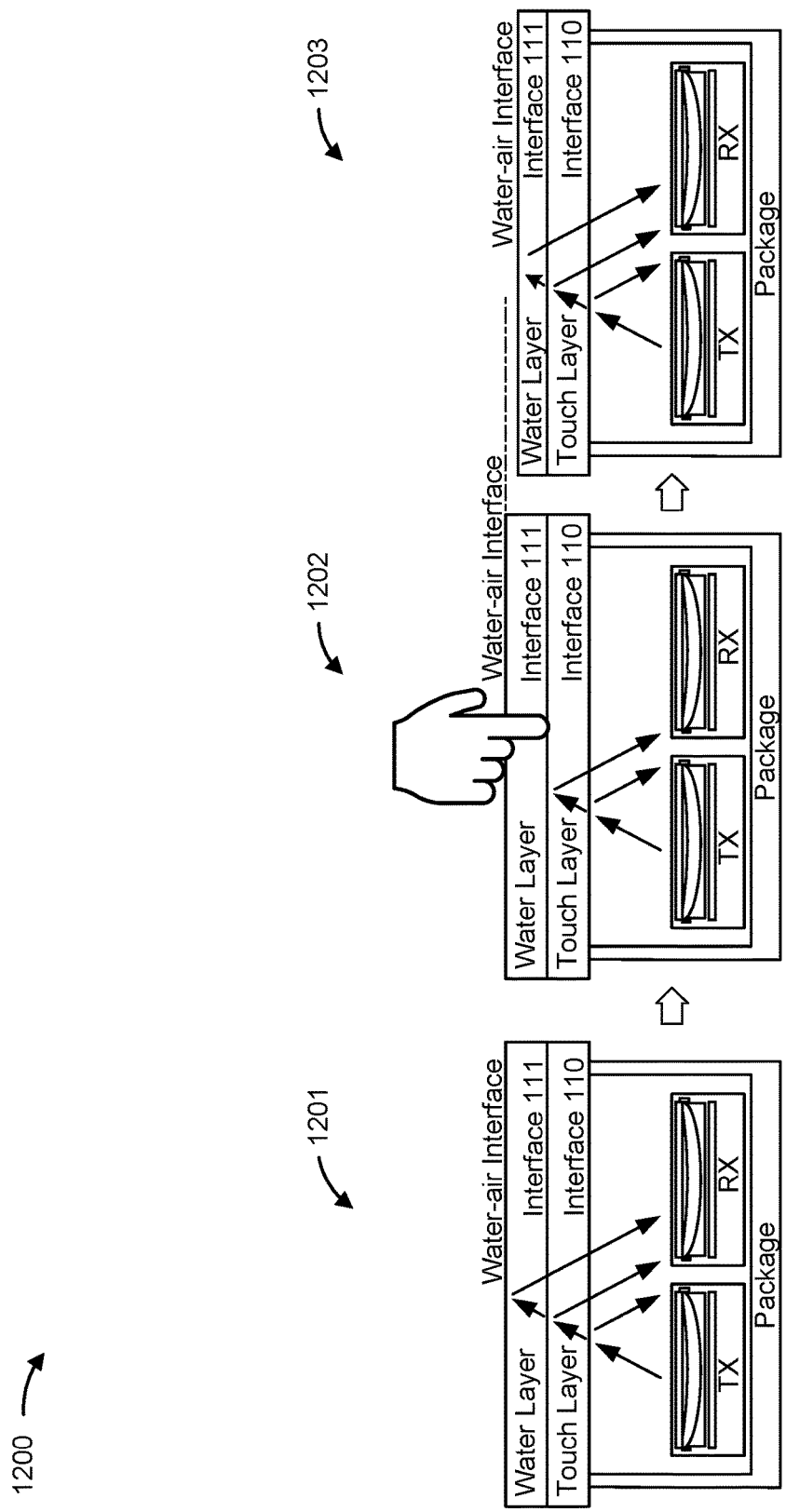
FIG. 12 illustrates a touch sequence according to one or more implementations.

FIG. 12 illustrates a touch sequence 1200 according to one or more implementations. The touch sequence 1200 includes a first stage 1201 during which a water layer is present on an ultrasonic touch sensor, a second stage 1202 during which a touch is made through the water layer with a finger, and a third stage 1203 during which the touch is released from the water layer. During the third stage 1203 some of the water of the water layer adheres to the finger and is carried away by the finger. As a result, a thickness of the water layer changes (e.g., decreases). An interaction of the finger with the water layer can cause a shift in time-of-flights of ultrasonic reflections between the three stages 1201, 1202, and 1203. In other words, the interaction of the finger with the water layer causes a shift in the time-of-flight of the ultrasonic reflections arriving at the receiver 106 from the third interface (e.g., the water-air interface). As a result, significant changes in amplitude in the ultrasonic reflections made at the third interface and the fourth interface may occur, which may make reliable touch detections difficult. As a result of the change in the thickness of the water layer, the second observation window 702 and the third observation window 703 needed for a reliable touch/no-touch decision may change, since the second observation window 702 and the third observation window 703 depend on when ultrasonic reflected waves are expected to be received at the receiver 106 from the water-air interface. According, the measurement circuit may use an automatic observation window search to determine optimal timing intervals to be used for the second observation window 702 and/or the third observation window 703.

As indicated above, FIG. 12 is provided as an example. Other examples may differ from what is described with regard to FIG. 12.

Figure 13:
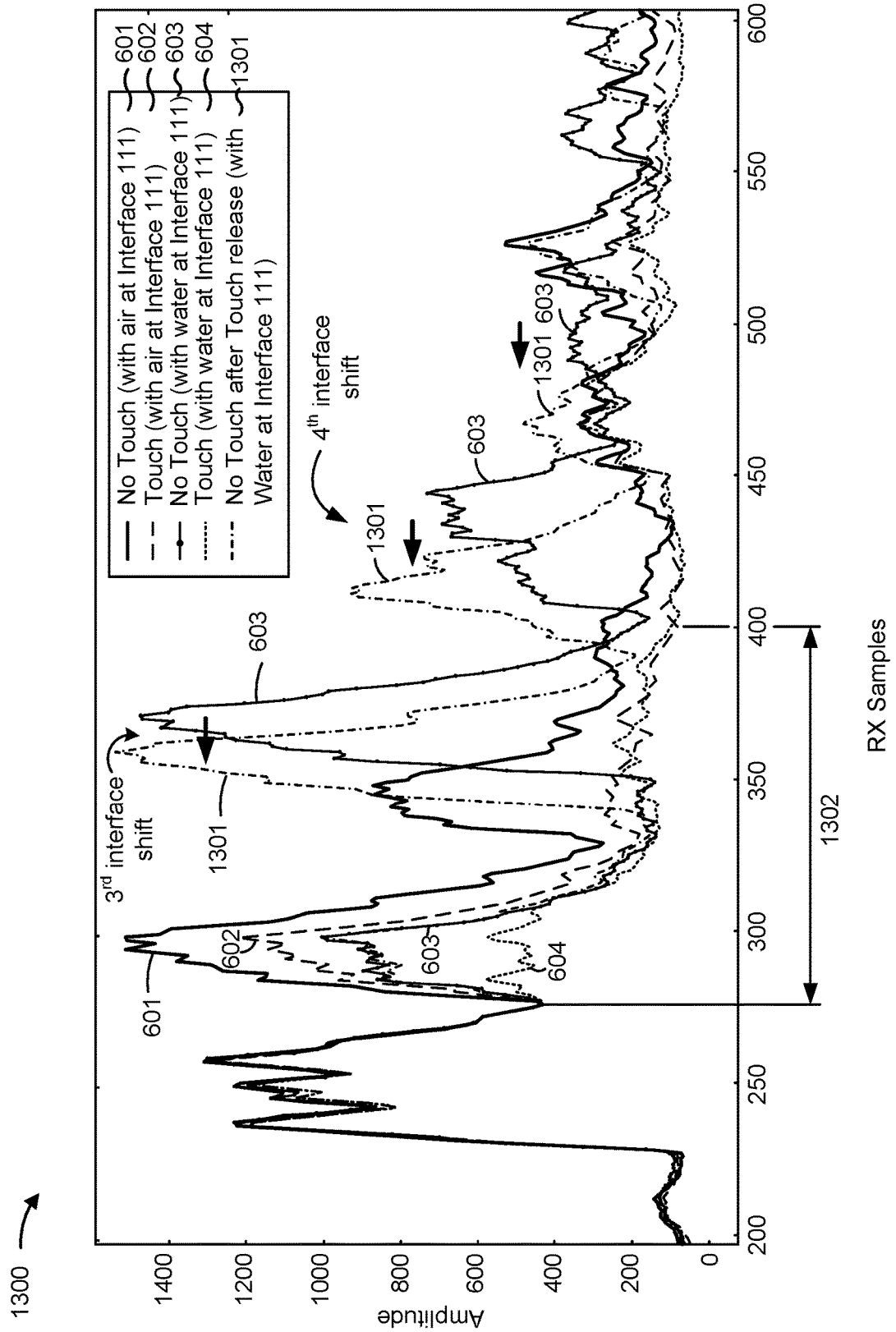
FIG. 13 illustrates a waveform diagram according to one or more implementations.

FIG. 13 illustrates a waveform diagram 1300 according to one or more implementations. The waveform diagram 1300 includes the no-touch response signal 601 with air present at the second interface, the touch response signal 602 with air present at the second interface 111, the no-touch response signal 603 with water present at the second interface 111, and the touch response signal 604 with water present at the second interface 111. In this example, the no-touch response signal 603 corresponds to a no-touch event prior to a touch event. For example, the no-touch response signal 603 may correspond to the first stage 1201 illustrated in FIG. 12. The waveform diagram 1300 further includes a no-touch response signal 1301 with water present at the second interface 111 that occurs after the touch event. For example, the no-touch response signal 1301 may correspond to the third stage 1203 illustrated in FIG. 12. As a result of the touch event that occurs during the second stage 1202, the thickness of the water layer is reduced. Thus, the time-of-flights for ultrasonic reflections occurring at the water-air interface (e.g., the third interface and the fourth interface) are also reduced. The ultrasonic reflections corresponding to the no-touch response signal 1301 are shifted to the left to earlier points in time in comparison to the ultrasonic reflections corresponding to the no-touch response signal 603. As a result of the shift in the time-of-flights, distance measurements (e.g., Euclidean distance measurements) calculated for an observation window 1302 based on samples acquired prior to the touch event and distance measurements calculated for the observation window 1302 based on samples acquired after to the touch event would be different. Accordingly, a sliding observation window mechanism may be used for automatically detecting the water-air interface to determine an optimum time interval to be used for the observation window 1302 to provide reliable calculations for the measured value S2.

As indicated above, FIG. 13 is provided as an example. Other examples may differ from what is described with regard to FIG. 13.

Figure 14:
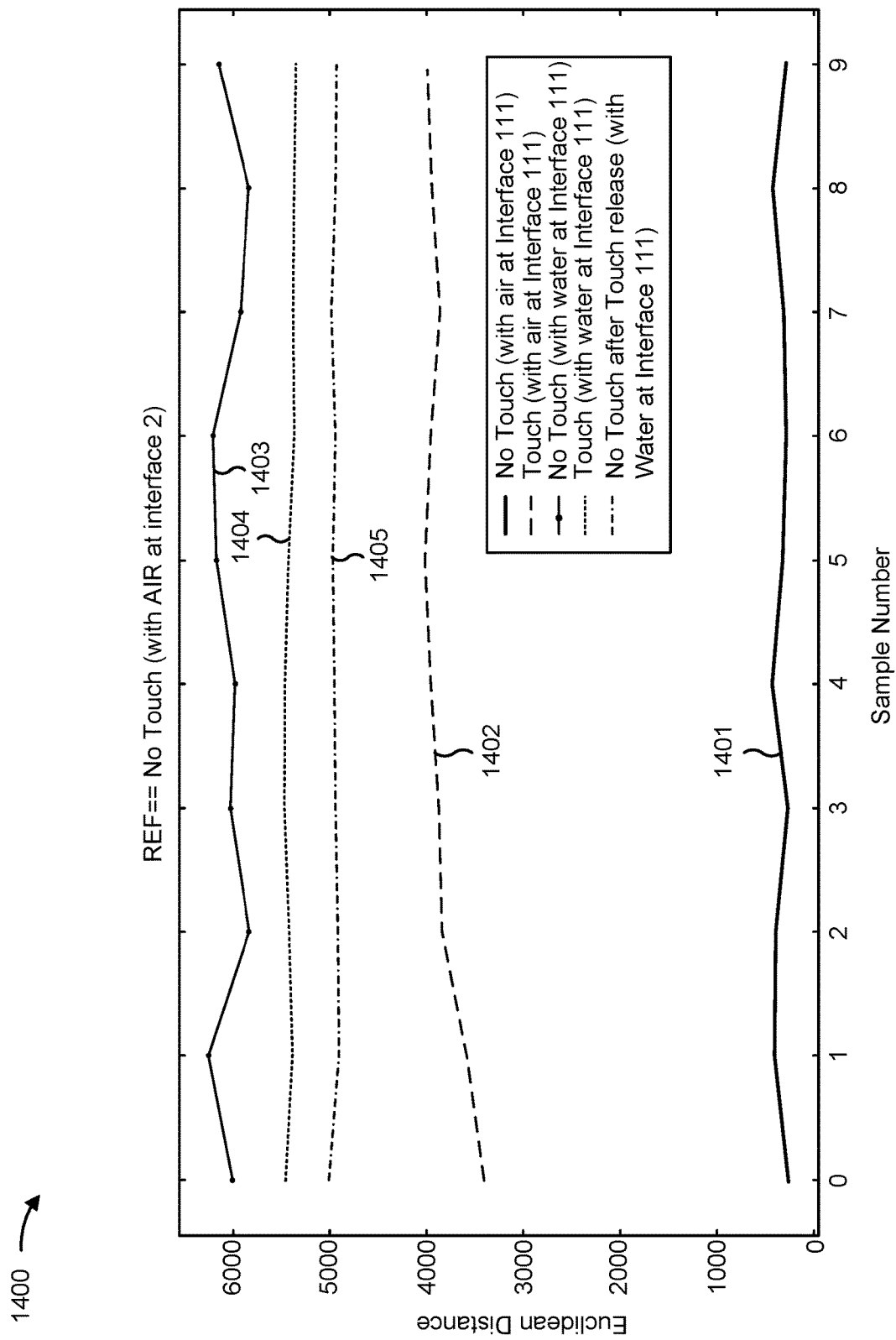
FIG. 14 illustrates a waveform diagram according to one or more implementations.

FIG. 14 illustrates a waveform diagram 1400 according to one or more implementations. The waveform diagram 1400 includes Euclidean distance signals 1401-1405 generated by the measurement circuit and corresponding to the response signals 601, 602, 603, 604, and 1301 illustrated in FIG. 13, respectively. The Euclidean distance signals 1401-1405 are computed based on samples acquired over an entire duration of the observation window 1302 illustrated in FIG. 13. The Euclidean distance signal 1401 may be representative of a Euclidean distance of the no-touch response signal 601 to the reference signal (e.g., the no-touch response signal 601 recorded during a configuring of the ultrasonic touch sensor). Since the no-touch response signal 601 measured during operation should be similar to the no-touch response signal 601 recorded during the configuring, the Euclidean distance is small. The Euclidean distance signal 1402 may be representative of the Euclidean distance of the touch response signal 602 to the reference signal. The Euclidean distance signal 1403 may be representative of the Euclidean distance of the no-touch response signal 603 (prior to the touch event) to the reference signal. The Euclidean distance signal 1404 may be representative of the Euclidean distance of the touch response signal 604 to the reference signal. The Euclidean distance signal 1405 may be representative of the Euclidean distance of the no-touch response signal 1301 (after the touch event) to the reference signal. After the touch event, the Euclidean distance signal 1405 is shifted downward or reduced relative to the Euclidean distance signal 1403. Moreover, the Euclidean distance signal of a water no-touch response may be greater than Euclidean distance signal 1404 prior to the touch event (e.g., the Euclidean distance signal 1403 may be greater than Euclidean distance signal 1404). After the touch event, the Euclidean distance signal of the water no-touch response may be less than Euclidean distance signal 1404 prior to the touch event (e.g., the Euclidean distance signal 1403 may be less than Euclidean distance signal 1404). Thus, the threshold decision algorithm may not be able to properly distinguish between different types of signals or different types of events without a calibrated (adjusted) observation window. Time intervals of the observation windows 702 and/or 703 may be adjusted based on an automatic observation window search that is based on detecting the water-air interface (e.g., detecting a thickness of the water layer) and calculating one or more expected time-of-flights of the ultrasonic reflections from the water-air interface to be received at the receiver 106.

As indicated above, FIG. 14 is provided as an example. Other examples may differ from what is described with regard to FIG. 14.

Figure 15:
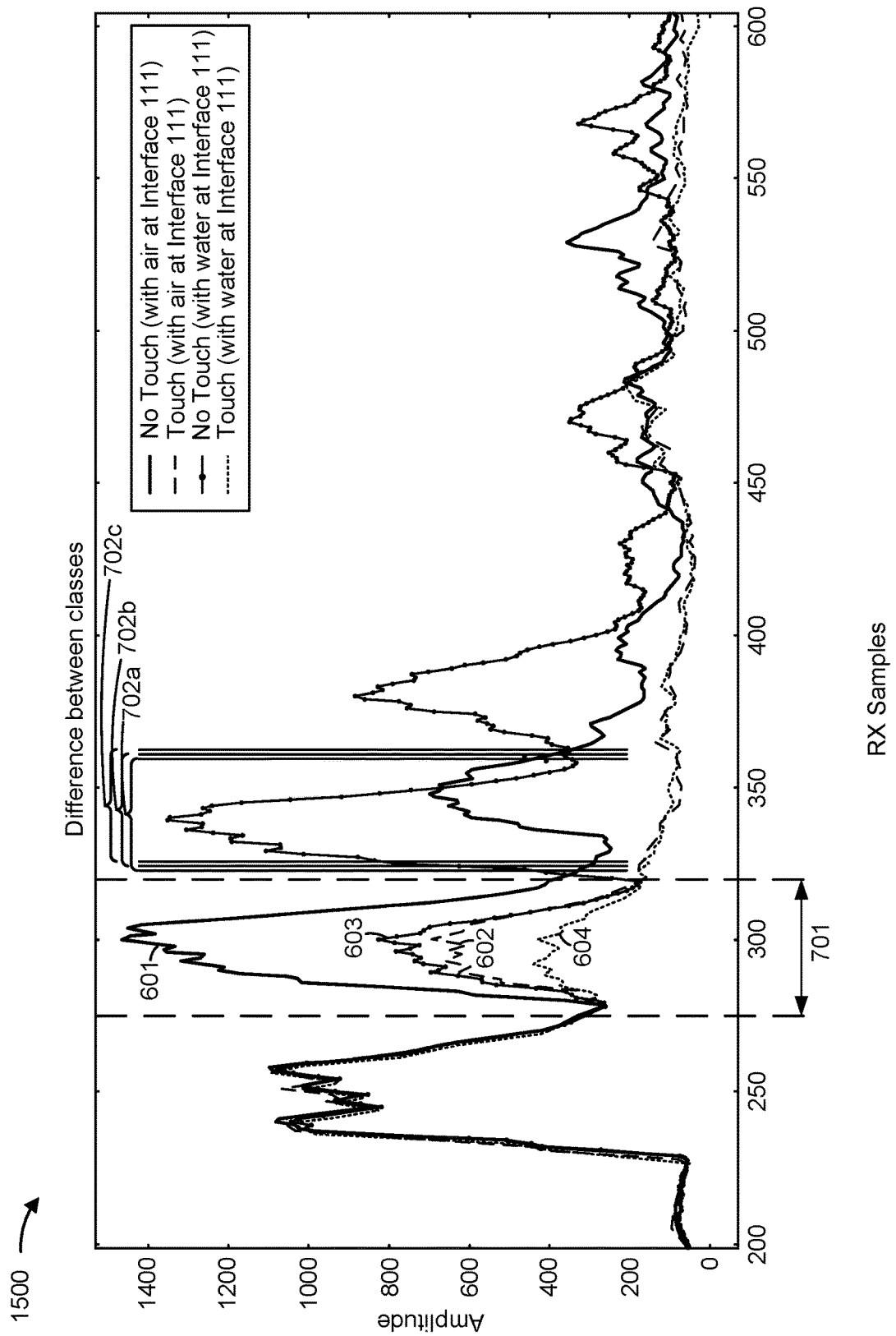
FIG. 15 illustrates a waveform diagram according to one or more implementations.

FIG. 15 illustrates a waveform diagram 1500 according to one or more implementations. The waveform diagram 1500 includes the no-touch response signal 601 with air present at the second interface, the touch response signal 602 with air present at the second interface 111, the no-touch response signal 603 with water present at the second interface 111, and the touch response signal 604 with water present at the second interface 111. The measurement circuit of the ultrasonic touch sensor 300 may apply an automatic observation window search algorithm to determine an optimum time interval for the second observation window 702. The optimum time interval of the second observation window 702 may be adjusted based on the automatic observation window search algorithm. In other words, a start time and a stop time of the second observation window 702 may be determined using the automatic observation window search algorithm, and the start time and a stop time of the second observation window 702 may be used for determining the second comparison result, as described in connection with FIG. 7B. For example, once the optimum time interval for the second observation window 702 is determined, the measurement circuit may acquire a second plurality of digital samples of the measurement signal during the second observation window 702, calculate a second distance value (e.g., a second Euclidean distance) of the second plurality of digital samples relative to a reference signal, and determine the second comparison result based on whether the second distance value satisfies a second threshold range.

As indicated above, FIG. 15 is provided as an example. Other examples may differ from what is described with regard to FIG. 15.

Figure 16:
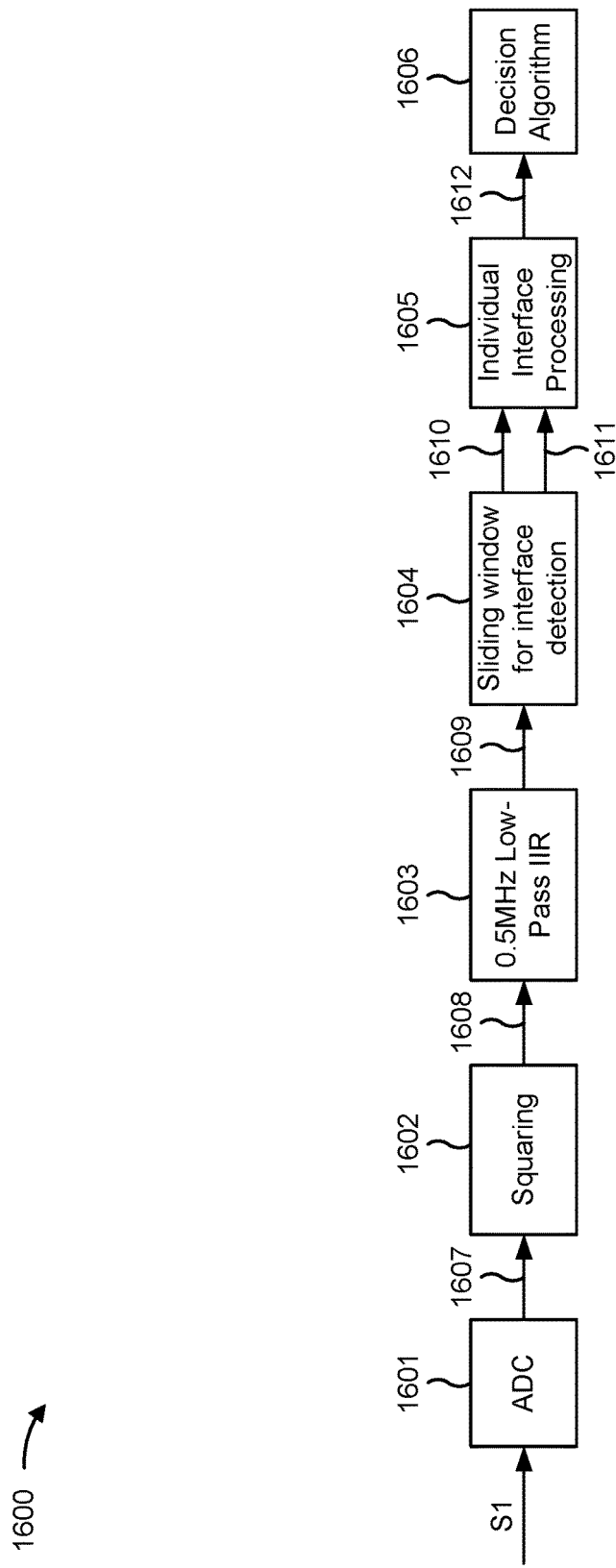
FIG. 16 illustrates a schematic block diagram of a measurement circuit according to one or more implementations.

FIG. 16 illustrates a schematic block diagram of a measurement circuit 1600 according to one or more implementations. The measurement circuit 1600 may include an ADC 1601, a squaring circuit 1602, a low-pass infinite impulse response (IIR) filter 1603, a sliding window detection unit 1604, an individual processing unit 1605, and a comparison circuit 1606. The ADC 1601, the squaring circuit 1602, and the low-pass IIR filter 1603, the sliding window detection unit 1604, the individual processing unit 1605 may be provided in the processing circuit 301, whereas the comparison circuit 1606 may include the comparator circuit 302. The sliding window detection unit 1604 and the individual processing unit 1605 may be implemented by a processor configured with a processing algorithm.

The ADC 1601 may receive the measurement signal S1 and convert the measurement signal S1 into a digital measurement signal 1607. The squaring circuit 1602 may perform a squaring function on the digital measurement signal 1607 to generate a rectified signal 1608. The low-pass IIR filter 1603 may receive the rectified signal 1608 and generate a filtered signal 1609. The low-pass IIR filter 1603 may have a cut-off frequency of 0.5 MHz. The filtered signal 1609 of the low-pass IIR filter 1603 may be similar to one of the response signals 601-604 described herein.

The sliding window detection unit 1604 may be optional and may be configured to apply the automatic observation window search algorithm to determine the optimum time interval for the second observation window 702. If the sliding window detection unit 1604 is disabled or not present, the time interval for the second observation window 702 may be fixed (e.g., predetermined by programming). In some implementations, a plurality of different time intervals for the second observation window 702 may be stored in the memory device of the ultrasonic touch sensor 300, and the sliding window detection unit 1604 may be configured to select one of the different time intervals for the second observation window 702 based on a result of the automatic observation window search algorithm. For example, a first time interval 702*a*, a second time interval 702*b*, and a third time interval 702*c* for the second observation window 702 may be stored in the memory device, and the sliding window detection unit 1604 may select one of the first time interval 702*a*, the second time interval 702*b*, or the third time interval 702*c* to be used by the individual processing unit 1605.

During an automatic observation window search for the second observation window 702, the signal generator 304 may generate an excitation signal for producing an ultrasonic transmit wave. The transmitter 105 may receive the excitation signal and transmit the ultrasonic transmit wave toward the touch structure 102 based on the excitation signal. The receiver 106 may receive ultrasonic reflected waves produced by a plurality of reflections of the ultrasonic transmit wave and generate a measurement signal representative of the ultrasonic reflected waves. The individual processing unit 1605 may acquire a first plurality of digital samples of the measurement signal during the first observation window 701, as described in connection with FIG. 7A. The first plurality of digital samples may correspond to the ultrasonic reflected wave 114 produced by a reflection of the ultrasonic transmit wave at the second interface 111 (e.g., the touch interface). The sliding window detection unit 1604 may search for the second observation window 702 that is subsequent in time to the first observation window 701. Once the sliding window detection unit 1604 determines the time interval for the second observation window 702, the individual processing unit 1605 may acquire a second plurality of digital samples of the measurement signal in the second observation window 702, as described in connection with FIG. 7B. The second observation window 702 may correspond to the secondary reflection 115 (e.g., a second ultrasonic reflected wave) produced by a reflection of the ultrasonic transmit wave at the water-air interface (e.g., the third interface) formed by water being present on the touch surface 104. The comparison circuit 1606 may determine whether a no-touch event or a touch event has occurred based on the first plurality of digital samples and the second plurality of digital samples based on a threshold decision algorithm (e.g., based on the process 1100 described in connection with FIG. 11). For example, the individual processing unit 1605 may calculate a first distance value (e.g., a first Euclidean distance value) of the first plurality of digital samples relative to a reference signal, and calculate a second distance value (e.g., a second Euclidean distance value) of the second plurality of digital samples relative to the reference signal. The comparison circuit 1606 may determine whether the no-touch event or the touch event has occurred based on the first distance value and the second distance value.

The first observation window 701 may be is fixed, since the location of the second interface 111 is fixed, and the second observation window 702 may be adjustable, since the thickness of the water layer is variable.

The sliding window detection unit 1604 may acquire first test digital samples of the measurement signal in a first possible observation window corresponding to the first time interval 702a, and calculate a first distance test value (e.g., a first Euclidean distance test value) of the first test digital samples relative to first reference digital samples that correspond to the first possible observation window. Additionally, the sliding window detection unit 1604 may acquire second test digital samples of the measurement signal in a second possible observation window corresponding to the second time interval 702b, and calculate a second distance test value (e.g., a second Euclidean distance test value) of the second test digital samples relative to second reference digital samples that correspond to the second possible observation window. Additionally, the sliding window detection unit 1604 may acquire third test digital samples of the measurement signal in a third possible observation window corresponding to the third time interval 702c, and calculate a third distance test value (e.g., a third Euclidean distance test value) of the third test digital samples relative to third reference digital samples that correspond to the third possible observation window. The sliding window detection unit 1604 may select the first possible observation window, the second possible observation window, or the third possible observation window as the second observation window 702 based on the first distance test value, the second distance test value, and the third distance test value. For example, the sliding window detection unit 1604 may select the first possible observation window (e.g., the first time interval 702a) as the second observation window 702 if the first distance test value is greater than the second distance test value and the third distance test value, the sliding window detection unit 1604 may select the second possible observation window (e.g., the second time interval 702b) as the second observation window 702 if the second distance test value is greater than the first distance test value and the third distance test value, and the sliding window detection unit 1604 may select the third possible observation window (e.g., the third time interval 702c) as the second observation window 702 if the third distance test value is greater than the first distance test value and the second distance test value.

Alternatively, the sliding window detection unit 1604 may slide the second observation window 702 to the right a predefined amount, such as 4 or 5 samples or sampling cycles), repeat a computation of the distance test value, compare a current result with a stored maximum, and update the stored maximum if the current result is greater than the stored maximum. Thus, the sliding window detection unit 1604 may iteratively slide the second observation window 702 to the right until an optimum position of the second observation window 702 is determined to correspond to a maximum amongst all computations performed for the second observation window 702. The automatic observation window search algorithm may be implemented as to support multiple water interfaces. For example, the sliding window detection unit 1604 may monitor values of successively computed results, and determine if the slope is negative. If the slope is negative, the sliding window detection unit 1604 may determine that a maximum has been already reached and the water-air interface has been found.

The sliding window detection unit 1604 may provide the filtered signal 1609 to the individual processing unit 1605 as signal 1610. Additionally, the sliding window detection unit 1604 may indicate the determined second observation window 702 to the individual processing unit 1605 in a configuration signal 1611. The individual processing unit 1605 may provide processed output signals 1612 to the comparison circuit 1606. For example, the processed output signals 1612 may represent the measured values S2.

As indicated above, FIG. 16 is provided as an example. Other examples may differ from what is described with regard to FIG. 16.

The following provides an overview of some Aspects of the present disclosure:

Aspect 1: An ultrasonic touch sensor, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and a measurement circuit coupled to the capacitive ultrasonic receiver and configured to: acquire a first plurality of digital samples of the measurement signal during a first observation window that corresponds to a first ultrasonic reflected wave produced by a reflection of the ultrasonic transmit wave at the touch interface, calculate a first distance value of the first plurality of digital samples relative to a reference signal, and determine a first comparison result based on whether the first distance value satisfies a first threshold range, acquire a second plurality of digital samples of the measurement signal during a second observation window that is subsequent in time to the first observation window, calculate a second distance value of the second plurality of digital samples relative to the reference signal, and determine a second comparison result based on whether the second distance value satisfies a second threshold range, and determine whether a no-touch event or a touch event has occurred based on the first comparison result and the second comparison result.

Aspect 2: The ultrasonic touch sensor of Aspect 1, wherein the first threshold range is different from the second threshold range.

Aspect 3: The ultrasonic touch sensor of any of Aspects 1-2, wherein the second observation window corresponds to a second ultrasonic reflected wave produced by a reflection of the ultrasonic transmit wave at a water-air interface formed by water being present on the touch surface.

Aspect 4: The ultrasonic touch sensor of any of Aspects 1-3, wherein the second observation window corresponds to a time interval during which a second ultrasonic reflected wave is expected to be received by the capacitive ultrasonic receiver if water is present on the touch surface.

Aspect 5: The ultrasonic touch sensor of any of Aspects 1-4, wherein the measurement circuit is configured to: acquire a third plurality of digital samples of the measurement signal during a third observation window that is subsequent in time to the second observation window, calculate a third distance value of the third plurality of digital samples relative to the reference signal, and determine a third comparison result based on whether the third distance value satisfies a third threshold range, and determine whether the no-touch event or the touch event has occurred based on the first comparison result, the second comparison result, and the third comparison result.

Aspect 6: The ultrasonic touch sensor of Aspect 5, wherein the second observation window corresponds to a time interval during which a second ultrasonic reflected wave is expected to be received by the capacitive ultrasonic receiver if water is present on the touch surface, and wherein the third observation window corresponds to a time interval during which a third ultrasonic reflected wave is expected to be received by the capacitive ultrasonic receiver if water is present on the touch surface.

Aspect 7: The ultrasonic touch sensor of Aspect 6, wherein the first observation window, the second observation window, and the third observation window correspond to different times of flight (e.g., time-of-flights) of the ultrasonic reflected waves.

Aspect 8: The ultrasonic touch sensor of any of Aspects 1-7, wherein the first distance value is a first Euclidean distance and the second distance value is a second Euclidean distance.

Aspect 9: The ultrasonic touch sensor of any of Aspects 1-8, wherein the reference signal comprises a plurality of reference samples.

Aspect 10: The ultrasonic touch sensor of any of Aspects 1-9, wherein the reference signal corresponds to a reference no-touch event.

Aspect 11: The ultrasonic touch sensor of any of Aspects 1-10, wherein the reference signal corresponds to a reference touch event.

Aspect 12: The ultrasonic touch sensor of any of Aspects 1-11, wherein the measurement circuit is configured to: apply a first weighted factor to the first comparison result based on a first difference between the first distance value and a first minimum value that defines a minimum of the first threshold range to generate a first weighed comparison result, apply a second weighted factor to the second comparison result based on a second difference between the second distance value and a second minimum value that defines a minimum of the second threshold range to generate a second weighed comparison result, and determine whether a no-touch event or a touch event has occurred based on the first weighed comparison result and the second weighed comparison result.

Aspect 13: The ultrasonic touch sensor of any of Aspects 1-12, wherein the measurement circuit is configured to detect a presence of water on the touch surface based on the first comparison result and the second comparison result.

Aspect 14: The ultrasonic touch sensor of any of Aspects 1-13, wherein the measurement circuit is configured invalidate a touch decision, made based solely on the first comparison result, based on the second comparison result.

Aspect 15: An ultrasonic touch sensor, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and a measurement circuit coupled to the capacitive ultrasonic receiver and configured to: acquire a first plurality of digital samples of the measurement signal during a first observation window that corresponds to a first ultrasonic reflected wave produced by a reflection of the ultrasonic transmit wave at the touch interface, and calculate a first distance value of the first plurality of digital samples relative to a reference signal, acquire a second plurality of digital samples of the measurement signal during a second observation window that is subsequent in time to the first observation window, and calculate a second distance value of the second plurality of digital samples relative to the reference signal, and determine whether a no-touch event or a touch event has occurred based on the first distance value and the second distance value.

Aspect 16: The ultrasonic touch sensor of Aspect 15, wherein the measurement circuit is configured to: acquire a third plurality of digital samples of the measurement signal during a third observation window that is subsequent in time to the second observation window, calculate a third distance value of the third plurality of digital samples relative to the reference signal, and determine whether the no-touch event or the touch event has occurred based on the first distance value, the second distance value, and the third distance value Aspect 17: The ultrasonic touch sensor of Aspect 16, wherein the second observation window corresponds to a time interval during which a second ultrasonic reflected wave is expected to be received by the capacitive ultrasonic receiver if water is present on the touch surface, and wherein the third observation window corresponds to a time interval during which a third ultrasonic reflected wave is expected to be received by the capacitive ultrasonic receiver if water is present on the touch surface.

Aspect 18: The ultrasonic touch sensor of Aspect 1, wherein the measurement circuit comprises: an analog-to-digital converter (ADC) configured to receive the measurement signal and generate a digital measurement signal comprising the first plurality of digital samples and the second plurality of digital samples; a squaring circuit configured to perform a squaring function on the digital measurement signal to generate a rectified digital signal; a low-pass infinite impulse response (IIR) filter configured to receive the rectified digital signal and generate an output signal; and a processing circuit configured to calculate the first distance value and the second distance value based on the output signal and the reference signal.

Aspect 19: An ultrasonic touch sensor, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and a measurement circuit coupled to the capacitive ultrasonic receiver and configured to: acquire a first plurality of digital samples of the measurement signal during a first observation window that corresponds to a first ultrasonic reflected wave produced by a reflection of the ultrasonic transmit wave at the touch interface, and calculate a first distance value of the first plurality of digital samples relative to a first plurality of reference samples that correspond to the first observation window, acquire a second plurality of digital samples of the measurement signal during a second observation window that is subsequent in time to the first observation window, and calculate a second distance value of the second plurality of digital samples relative to a second plurality of reference samples that correspond to the second observation window, and determine whether a no-touch event or a touch event has occurred based on the first distance value and the second distance value.

Aspect 20: An ultrasonic touch sensor, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and a measurement circuit coupled to the capacitive ultrasonic receiver, wherein the measurement circuit is configured to acquire a first plurality of digital samples of the measurement signal during a first observation window, wherein the first plurality of digital samples correspond to a first ultrasonic reflected wave produced by a reflection of the ultrasonic transmit wave at the touch interface, wherein the measurement circuit is configured to search for a second observation window that is subsequent in time to the first observation window, wherein the measurement circuit is configured to acquire a second plurality of digital samples of the measurement signal in the second observation window, wherein the second observation window corresponds to a second ultrasonic reflected wave produced by a reflection of the ultrasonic transmit wave at a water-air interface formed by water being present on the touch surface, and wherein the measurement circuit is configured to determine whether a no-touch event or a touch event has occurred based on the first plurality of digital samples and the second plurality of digital samples.

Aspect 21: The ultrasonic touch sensor of Aspect 20, wherein the second observation window corresponds to a time-of-flight of the second ultrasonic reflected wave.

Aspect 22: The ultrasonic touch sensor of any of Aspects 20-21, wherein the first observation window is fixed and the second observation window is adjustable.

Aspect 23: The ultrasonic touch sensor of any of Aspects 20-22, wherein the measurement circuit is configured to search for the second observation window by: acquiring first test digital samples of the measurement signal in a first possible observation window, calculating a first distance value of the first test digital samples relative to first reference digital samples that correspond to the first possible observation window, acquiring second test digital samples of the measurement signal in a second possible observation window, wherein the second possible observation window is shifted later in time relative to the first possible observation window, calculating a second distance value of the second test digital samples relative to second reference digital samples that correspond to the second possible observation window, and selecting the first possible observation window or the second possible observation window as the second observation window based on the first distance value and the second distance value.

Aspect 24: The ultrasonic touch sensor of Aspect 23, wherein the measurement circuit is configured to select the first possible observation window as the second observation window if the first distance value is greater than the second distance value, and wherein the measurement circuit is configured to select the second possible observation window as the second observation window if the second distance value is greater than the first distance value.

Aspect 25: The ultrasonic touch sensor of any of Aspects 20-24, wherein the measurement circuit is configured to: calculate a first distance value of the first plurality of digital samples relative to a reference signal, calculate a second distance value of the second plurality of digital samples relative to the reference signal, and determine whether the no-touch event or the touch event has occurred based on the first distance value and the second distance value.

Aspect 26: A system configured to perform one or more operations recited in one or more of Aspects 1-25.

Aspect 27: An apparatus comprising means for performing one or more operations recited in one or more of Aspects 1-25.

Aspect 28: A non-transitory computer-readable medium storing a set of instructions, the set of instructions comprising one or more instructions that, when executed by a device, cause the device to perform one or more operations recited in one or more of Aspects 1-25.

Aspect 29: A computer program product comprising instructions or code for executing one or more operations recited in one or more of Aspects 1-25.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible implementations.

What is claimed is:

1. An ultrasonic touch sensor, comprising:
a housing having an ultrasound chamber;
a touch structure comprising a touch surface configured to receive a touch, wherein the touch structure is coupled to the housing and arranged over the ultrasound chamber, and wherein the touch structure comprises a touch interface at the touch surface;
a signal generator configured to generate an excitation signal for producing an ultrasonic transmit wave;
a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal;
a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and
a measurement circuit coupled to the capacitive ultrasonic receiver and configured to:
acquire a first plurality of digital samples of the measurement signal during a first observation window that corresponds to a first ultrasonic reflected wave produced by a reflection of the ultrasonic transmit wave at the touch interface,
calculate a first distance value of the first plurality of digital samples relative to a reference signal,
determine a first comparison result based on whether the first distance value satisfies a first threshold range,
acquire a second plurality of digital samples of the measurement signal during a second observation window that is subsequent in time to the first observation window,
calculate a second distance value of the second plurality of digital samples relative to the reference signal,
determine a second comparison result based on whether the second distance value satisfies a second threshold range, and
determine whether a no-touch event or a touch event has occurred based on the first comparison result and the second comparison result.

2. The ultrasonic touch sensor of claim 1, wherein the first threshold range is different from the second threshold range.

3. The ultrasonic touch sensor of claim 1, wherein the second observation window corresponds to a second ultrasonic reflected wave produced by a reflection of the ultrasonic transmit wave at a water-air interface formed by water being present on the touch surface.

4. The ultrasonic touch sensor of claim 1, wherein the second observation window corresponds to a time interval during which a second ultrasonic reflected wave is expected to be received by the capacitive ultrasonic receiver if water is present on the touch surface.

5. The ultrasonic touch sensor of claim 1, wherein the measurement circuit is configured to:
acquire a third plurality of digital samples of the measurement signal during a third observation window that is subsequent in time to the second observation window, calculate a third distance value of the third plurality of digital samples relative to the reference signal, and determine a third comparison result based on whether the third distance value satisfies a third threshold range, and
determine whether the no-touch event or the touch event has occurred based on the first comparison result, the second comparison result, and the third comparison result.

6. The ultrasonic touch sensor of claim 5, wherein the second observation window corresponds to a time interval during which a second ultrasonic reflected wave is expected to be received by the capacitive ultrasonic receiver if water is present on the touch surface, and
wherein the third observation window corresponds to a time interval during which a third ultrasonic reflected wave is expected to be received by the capacitive ultrasonic receiver if water is present on the touch surface.

7. The ultrasonic touch sensor of claim 6, wherein the first observation window, the second observation window, and the third observation window correspond to different times of flight of the ultrasonic reflected waves.

8. The ultrasonic touch sensor of claim 1, wherein the first distance value is a first Euclidean distance and the second distance value is a second Euclidean distance.

9. The ultrasonic touch sensor of claim 1, wherein the reference signal comprises a plurality of reference samples.

10. The ultrasonic touch sensor of claim 1, wherein the reference signal corresponds to a reference no-touch event.

11. The ultrasonic touch sensor of claim 1, wherein the reference signal corresponds to a reference touch event.

12. The ultrasonic touch sensor of claim 1, wherein the measurement circuit is configured to:
apply a first weighted factor to the first comparison result based on a first difference between the first distance value and a first minimum value that corresponds to a minimum of the first threshold range to generate a first weighed comparison result,
apply a second weighted factor to the second comparison result based on a second difference between the second distance value and a second minimum value that corresponds to a minimum of the second threshold range to generate a second weighed comparison result, and
determine whether a no-touch event or a touch event has occurred based on the first weighed comparison result and the second weighed comparison result.

13. The ultrasonic touch sensor of claim 1, wherein the measurement circuit is configured to detect a presence of water on the touch surface based on the first comparison result and the second comparison result.

14. The ultrasonic touch sensor of claim 1, wherein the measurement circuit is configured to invalidate a touch decision, made based solely on the first comparison result, based on the second comparison result.

15. An ultrasonic touch sensor, comprising:
a housing having an ultrasound chamber;
a touch structure comprising a touch surface configured to receive a touch, wherein the touch structure is coupled to the housing and arranged over the ultrasound chamber, and wherein the touch structure comprises a touch interface at the touch surface;
a signal generator configured to generate an excitation signal for producing an ultrasonic transmit wave;
a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal;
a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and
a measurement circuit coupled to the capacitive ultrasonic receiver and configured to:
acquire a first plurality of digital samples of the measurement signal during a first observation window that corresponds to a first ultrasonic reflected wave produced by a reflection of the ultrasonic transmit wave at the touch interface,
calculate a first distance value of the first plurality of digital samples relative to a reference signal,
acquire a second plurality of digital samples of the measurement signal during a second observation window that is subsequent in time to the first observation window,
calculate a second distance value of the second plurality of digital samples relative to the reference signal, and
determine whether a no-touch event or a touch event has occurred based on the first distance value and the second distance value.

16. The ultrasonic touch sensor of claim 15, wherein the measurement circuit is configured to:
acquire a third plurality of digital samples of the measurement signal during a third observation window that is subsequent in time to the second observation window,
calculate a third distance value of the third plurality of digital samples relative to the reference signal, and
determine whether the no-touch event or the touch event has occurred based on the first distance value, the second distance value, and the third distance value.

17. The ultrasonic touch sensor of claim 16, wherein the second observation window corresponds to a time interval during which a second ultrasonic reflected wave is expected to be received by the capacitive ultrasonic receiver if water is present on the touch surface, and
wherein the third observation window corresponds to a time interval during which a third ultrasonic reflected wave is expected to be received by the capacitive ultrasonic receiver if water is present on the touch surface.

18. The ultrasonic touch sensor of claim 1, wherein the measurement circuit comprises:
an analog-to-digital converter (ADC) configured to receive the measurement signal and generate a digital measurement signal comprising the first plurality of digital samples and the second plurality of digital samples;
a squaring circuit configured to perform a squaring function on the digital measurement signal to generate a rectified digital signal;
a low-pass infinite impulse response (IIR) filter configured to receive the rectified digital signal and generate an output signal; and
a processing circuit configured to calculate the first distance value and the second distance value based on the output signal and the reference signal.

19. An ultrasonic touch sensor, comprising:
a housing having an ultrasound chamber;
a touch structure comprising a touch surface configured to receive a touch, wherein the touch structure is coupled to the housing and arranged over the ultrasound chamber, and wherein the touch structure comprises a touch interface at the touch surface;
a signal generator configured to generate an excitation signal for producing an ultrasonic transmit wave;
a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal;
a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and
a measurement circuit coupled to the capacitive ultrasonic receiver and configured to:
  acquire a first plurality of digital samples of the measurement signal during a first observation window that corresponds to a first ultrasonic reflected wave produced by a reflection of the ultrasonic transmit wave at the touch interface,
  calculate a first distance value of the first plurality of digital samples relative to a first plurality of reference samples that correspond to the first observation window,
  acquire a second plurality of digital samples of the measurement signal during a second observation window that is subsequent in time to the first observation window,
  calculate a second distance value of the second plurality of digital samples relative to a second plurality of reference samples that correspond to the second observation window, and
  determine whether a no-touch event or a touch event has occurred based on the first distance value and the second distance value.

20. An ultrasonic touch sensor, comprising:
a housing having an ultrasound chamber;
a touch structure comprising a touch surface configured to receive a touch, wherein the touch structure is coupled to the housing and arranged over the ultrasound chamber, and wherein the touch structure comprises a touch interface at the touch surface;
a signal generator configured to generate an excitation signal for producing an ultrasonic transmit wave;
a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal;
a capacitive ultrasonic receiver arranged within the ultrasound chamber, wherein the capacitive ultrasonic receiver is configured to receive ultrasonic reflected waves produced by a plurality of reflections of the ultrasonic transmit wave and generate a measurement signal representative of the ultrasonic reflected waves; and
a measurement circuit coupled to the capacitive ultrasonic receiver,
  wherein the measurement circuit is configured to acquire a first plurality of digital samples of the measurement signal during a first observation window, wherein the first plurality of digital samples correspond to a first ultrasonic reflected wave produced by a reflection of the ultrasonic transmit wave at the touch interface,
  wherein the measurement circuit is configured to search for a second observation window that is subsequent in time to the first observation window, wherein the measurement circuit is configured to acquire a second plurality of digital samples of the measurement signal in the second observation window, wherein the second observation window corresponds to a second ultrasonic reflected wave produced by a reflection of the ultrasonic transmit wave at a water-air interface formed by water being present on the touch surface, and
  wherein the measurement circuit is configured to determine whether a no-touch event or a touch event has occurred based on the first plurality of digital samples and the second plurality of digital samples.

21. The ultrasonic touch sensor of claim 20, wherein the second observation window corresponds to a time-of-flight of the second ultrasonic reflected wave.

22. The ultrasonic touch sensor of claim 20, wherein the first observation window is fixed and the second observation window is adjustable.

23. The ultrasonic touch sensor of claim 20, wherein the measurement circuit is configured to search for the second observation window by:
  acquiring first test digital samples of the measurement signal in a first possible observation window,
  calculating a first distance value of the first test digital samples relative to first reference digital samples that correspond to the first possible observation window,
  acquiring second test digital samples of the measurement signal in a second possible observation window, wherein the second possible observation window is shifted later in time relative to the first possible observation window,
  calculating a second distance value of the second test digital samples relative to second reference digital samples that correspond to the second possible observation window, and
  selecting the first possible observation window or the second possible observation window as the second observation window based on the first distance value and the second distance value.

24. The ultrasonic touch sensor of claim 23, wherein the measurement circuit is configured to select the first possible observation window as the second observation window if the first distance value is greater than the second distance value, and
  wherein the measurement circuit is configured to select the second possible observation window as the second observation window if the second distance value is greater than the first distance value.

25. The ultrasonic touch sensor of claim 20, wherein the measurement circuit is configured to:
- calculate a first distance value of the first plurality of digital samples relative to a reference signal,
- calculate a second distance value of the second plurality of digital samples relative to the reference signal, and
- determine whether the no-touch event or the touch event has occurred based on the first distance value and the second distance value.

* * * * *